(12) United States Patent
Tanaka et al.

(10) Patent No.: US 8,885,212 B2
(45) Date of Patent: Nov. 11, 2014

(54) CONVERTING BETWEEN COLOR AND MONOCHROME

(75) Inventors: Shun Tanaka, West New York, NJ (US); Yuki Uchida, West Caldwell, NJ (US)

(73) Assignee: Ricoh Company, Ltd., Tokyo (JP)

( * ) Notice: Subject to any disclaimer, the term of this patent is extended or adjusted under 35 U.S.C. 154(b) by 729 days.

(21) Appl. No.: 13/036,745

(22) Filed: Feb. 28, 2011

(65) Prior Publication Data
US 2012/0218570 A1 Aug. 30, 2012

(51) Int. Cl.
*G06F 15/00* (2006.01)
*H04N 1/60* (2006.01)

(52) U.S. Cl.
CPC .................................. *H04N 1/60* (2013.01)
USPC ............... 358/1.9; 358/1.1; 382/243

(58) Field of Classification Search
USPC ..................... 358/1.9, 1.1; 382/243
See application file for complete search history.

(56) References Cited

U.S. PATENT DOCUMENTS

| | | | |
|---|---|---|---|
| 5,485,288 A * | 1/1996 | Kamei et al. | 358/530 |
| 5,726,781 A * | 3/1998 | Isemura et al. | 358/530 |
| 5,929,839 A * | 7/1999 | Matsumoto | 345/589 |
| 7,227,655 B1 | 6/2007 | Uchida et al. | |
| 7,321,867 B1 | 1/2008 | Uchida et al. | |
| 7,415,441 B1 | 8/2008 | Uchida | |
| 7,599,864 B2 | 10/2009 | Uchida et al. | |
| 7,624,045 B2 | 11/2009 | Uchida et al. | |
| 2004/0080789 A1 * | 4/2004 | Anderson | 358/2.1 |
| 2005/0264849 A1 * | 12/2005 | Hagiwara | 358/2.1 |
| 2008/0291471 A1 | 11/2008 | Uchida | |
| 2009/0276413 A1 | 11/2009 | Uchida | |
| 2010/0095354 A1 | 4/2010 | Uchida et al. | |
| 2011/0025715 A1 | 2/2011 | Uchida et al. | |
| 2011/0173270 A1 | 7/2011 | Uchida et al. | |

OTHER PUBLICATIONS

U.S. Appl. No. 12/722,367, filed Mar. 11, 2010 of Yuki Uchida et al.
U.S. Appl. No. 12/722,370, filed Mar. 11, 2010 of Yuki Uchida et al.
U.S. Appl. No. 12/722,374, filed Mar. 11, 2010 of Yuki Uchida et al.
U.S. Appl. No. 12/722,376, filed Mar. 11, 2010 of Yuki Uchida et al.
U.S. Appl. No. 12/722,381, filed Mar. 11, 2010 of Yuki Uchida et al.
U.S. Appl. No. 12/958,686, filed Dec. 2, 2010 of Shun Tanaka.
U.S. Appl. No. 13/014,384, filed Jan. 26, 2011 of Shun Tanaka.
U.S. Appl. No. 13/036,455, filed Feb. 28, 2011 of Shun Tanaka.
U.S. Appl. No. 13/036,558, filed Feb. 28, 2011 of Shun Tanaka.
U.S. Appl. No. 13/036,644, filed Feb. 28, 2011 of Shun Tanaka.
U.S. Appl. No. 13/086,608, filed Apr. 14, 2011 of Shun Tanaka et al.
U.S. Appl. No. 13/086,779, filed Apr. 14, 2011 of Shun Tanaka et al.

* cited by examiner

*Primary Examiner* — Benny Q Tieu
*Assistant Examiner* — Martin Mushambo
(74) *Attorney, Agent, or Firm* — Cooper & Dunham LLP

(57) ABSTRACT

Apparatuses, systems and methods are provided for converting a color portion of an image to monochrome, and/or for converting a monochrome portion of an image to color.

18 Claims, 34 Drawing Sheets

| COLOR CONVERSION INFORMATION ||
|---|---|
| Color | Line Pattern |
| Red |  |
| Green |  |
| Blue |  |

| (0,7) | (1,7) | (2,7) | (3,7) | (4,7) | (5,7) | (6,7) | (7,7) | (8,7) | (9,7) |
|---|---|---|---|---|---|---|---|---|---|
| (0,6) | (1,6) | (2,6) | (3,6) | (4,6) | (5,6) | (6,6) | (7,6) | (8,6) | (9,6) |
| (0,5) | (1,5) | (2,5) | (3,5) | (4,5) | (5,5) | (6,5) | (7,5) | (8,5) | (9,5) |
| (0,4) | (1,4) | (2,4) | (3,4) | (4,4) | (5,4) | (6,4) | (7,4) | (8,4) | (9,4) |
| (0,3) | (1,3) | (2,3) | (3,3) | (4,3) | (5,3) | (6,3) | (7,3) | (8,3) | (9,3) |
| (0,2) | (1,2) | (2,2) | (3,2) | (4,2) | (5,2) | (6,2) | (7,2) | (8,2) | (9,2) |
| (0,1) | (1,1) | (2,1) | (3,1) | (4,1) | (5,1) | (6,1) | (7,1) | (8,1) | (9,1) |
| (0,0) | (1,0) | (2,0) | (3,0) | (4,0) | (5,0) | (6,0) | (7,0) | (8,0) | (9,0) |

Fig. 9B

| COLOR CONVERSION INFORMATION ||
|---|---|
| Color | Line Pattern |
| Red |  |
| Green |  |
| Blue |  |
| Cyan |  |
| Magenta |  |
| Yellow |  |

| Color: | Combination Of: |
|---|---|
| Cyan | Green + Blue |
| Magenta | Red + Blue |
| Yellow | Red + Green |

Fig. 12

| COLOR CONVERSION INFORMATION ||
| :---: | :---: |
| Color | Line Pattern |
| Light Blue |  |
| Medium Blue |  |
| Dark Blue |  |

| COLOR CONVERSION INFORMATION ||
| --- | --- |
| Color | Line Pattern |
| Light Blue |  |
| Medium Blue |  |
| Dark Blue |  |

| COLOR CONVERSION INFORMATION | |
|---|---|
| Color | Line Pattern |
| Light Blue |  |
| Medium Blue |  |
| Dark Blue |  |

CONVERTING BETWEEN COLOR AND MONOCHROME

TECHNICAL FIELD

This disclosure relates to tools (systems, apparatuses, methodologies, computer program products, etc.) for converting a color portion of an image to monochrome, and/or for converting a monochrome portion of an image to color.

BACKGROUND

In the current information age, information technology (IT) tools are extensively used in enterprises and other organizations in order to facilitate processing of documents and data. In particular, the processing of color images with the use of IT tools (such as computers, printers, scanners, multi-function devices MFDs, other network-connected or standalone devices, etc.) is becoming far more prevalent. For example, many users desire to generate and output documents, pictures, presentation handouts and other materials that include color pictures, color charts or other color image elements.

However, the processing of documents or data including color portions typically requires greater storage, processing and network resources than that required for processing monochrome images. Further, there is a drawback that printing or outputting hardcopies of documents or data including color image portions generally consumes greater printer resources (such as toner) than that required for the output of monochrome images.

There remains a need for an improved tool for processing color and monochrome images.

SUMMARY

In an aspect of this disclosure, there is provided a tool (for example, an apparatus, application software, computer program product, etc.) to help with processing image data. Such tool maintains color conversion information mapping each of a plurality of colors to a corresponding line pattern, and in a case that a two-dimensional area of an image has a specific color that is homogeneous in the two-dimensional area, and it is determined, based on the color conversion information, a first line pattern corresponding to the specific color, and modifies the image by reproducing the two-dimensional area with the first line pattern in place of the specific color, to generate a converted image.

In another aspect, the line patterns which correspond to the plurality of colors are respective different line patterns.

In another aspect, each of the line patterns includes only a plurality of parallel lines oriented in a specific direction.

In another aspect, if it is determined that the specific color can be represented as a combination of two or more other colors in accordance with an additive (or subtractive) color scheme, then the first line pattern corresponding to the specific color is a combination of respective line patterns of the two or more other colors.

In another aspect, the tool determines a two-dimensional area of the image having a line pattern that is homogeneous in the two-dimensional area, and determines, based on color conversion information, a first color corresponding to the first line pattern, and modifies the image by reproducing the two-dimensional area with the first color in place of the first line pattern, to generate a converted image.

In another aspect, if it is determined that the first line pattern in a two-dimensional area of an image can be represented as a combination of respective line patterns of two or more other colors, then it is determined that the first color corresponding to the first line pattern is a combination of the two or more other colors in accordance with an additive color scheme. The tool modifies the image by reproducing the two-dimensional area with the first color in place of the first line pattern, to generate a converted image.

In another aspect, if it is determined that adjacent two-dimensional areas of the image include different shades of a particular color, then a line pattern corresponding to one of the adjacent two-dimensional areas is adjusted.

In another aspect, if it is determined that line patterns in adjacent two-dimensional areas of the converted image have similar properties, then one of the line patterns in the adjacent two-dimensional areas of the converted image is adjusted.

BRIEF DESCRIPTION OF THE DRAWINGS

The aforementioned and other aspects, features and advantages can be more readily understood from the following detailed description with reference to the accompanying drawings wherein:

FIGS. 9A and 9B illustrate aspects of a process for determining a two-dimensional area of a color image having a color that is homogeneous in the two-dimensional area, according to an exemplary embodiment;

FIG. 12 shows an example of a table registering information indicating how each of a plurality of colors can be represented as combination of other colors, according to an exemplary embodiment;

DETAILED DESCRIPTION

Figure 1:
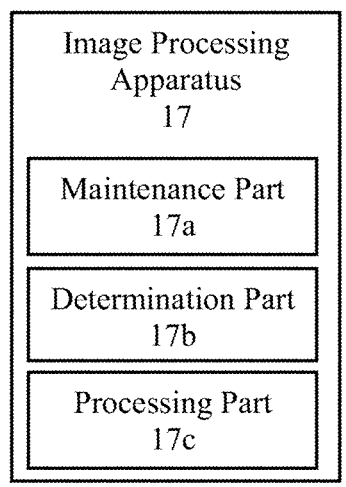
FIG. 1 shows a block diagram of an image forming apparatus, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there is described tools (systems, apparatuses, methodologies, computer program products, etc.) for converting one or more color portions of an image to monochrome portion(s), and/or for converting one or more monochrome portions of an image to color portion(s).

For example, FIG. 1 shows schematically an image processing apparatus 17 for processing color and/or monochrome images. Image processing apparatus 17 includes a maintenance part 17a, determination part 17b, and a processing part 17c.

Figure 2:
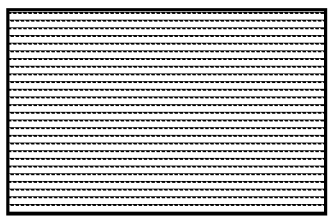
FIG. 2 shows an example of a table registering color conversion information, according to an exemplary embodiment.
Figure 2:
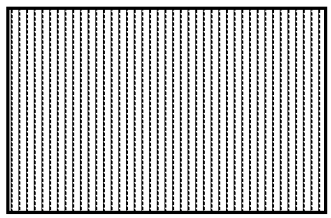
Figure 2:
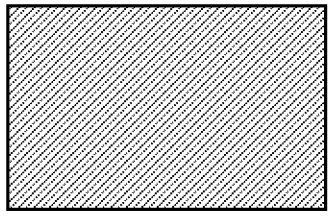
Figure 5:
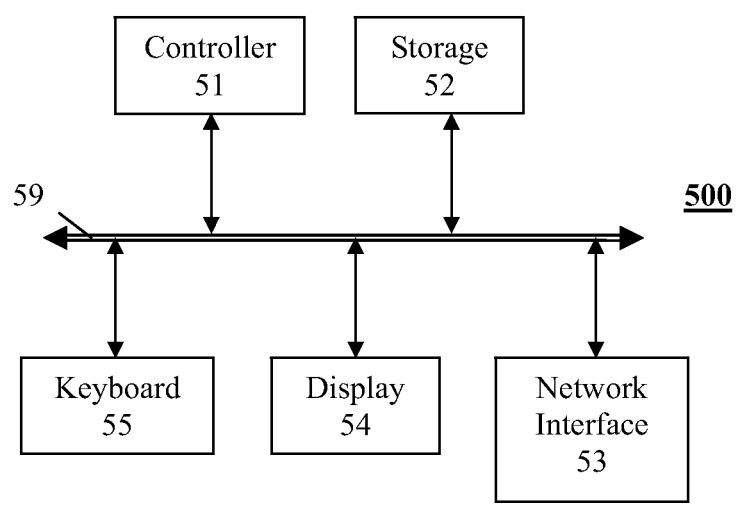
FIG. 5 shows a block diagram of an exemplary configuration of a computer that can be used to implement an image processing apparatus, such as image processing apparatus 17 of FIG. 1.

The maintenance part 17a of the image forming apparatus 17 is configured to maintain color conversion information mapping each of a plurality of colors to a corresponding line pattern. An example of color conversion information is depicted in FIG. 2. In the example of FIG. 2, the color conversion information identifies a plurality of colors, such as red, green and blue. The color conversion information of FIG. 2 lists, for each of the colors, a corresponding line pattern. For example, the line pattern corresponding to the color red is a horizontal line pattern, the line pattern corresponding to the color green is a vertical line pattern, the line pattern corresponding to the color blue is a diagonal line pattern, etc., as seen in the example of FIG. 2. The information depicted in FIG. 2 is merely exemplary, and other colors and/or line patterns may be included in the color conversion information. The color conversion information maintained by the maintenance part 17a may stored in the maintenance part 17a or a storage part of the information processing apparatus. For example, FIG. 5 shows a block diagram of an exemplary configuration of a computer 500 that can be used to implement an image processing apparatus, such as image processing apparatus 17 of FIG. 1, where the color conversion information may be stored in storage part 52 of computer 500.

Figure 6:
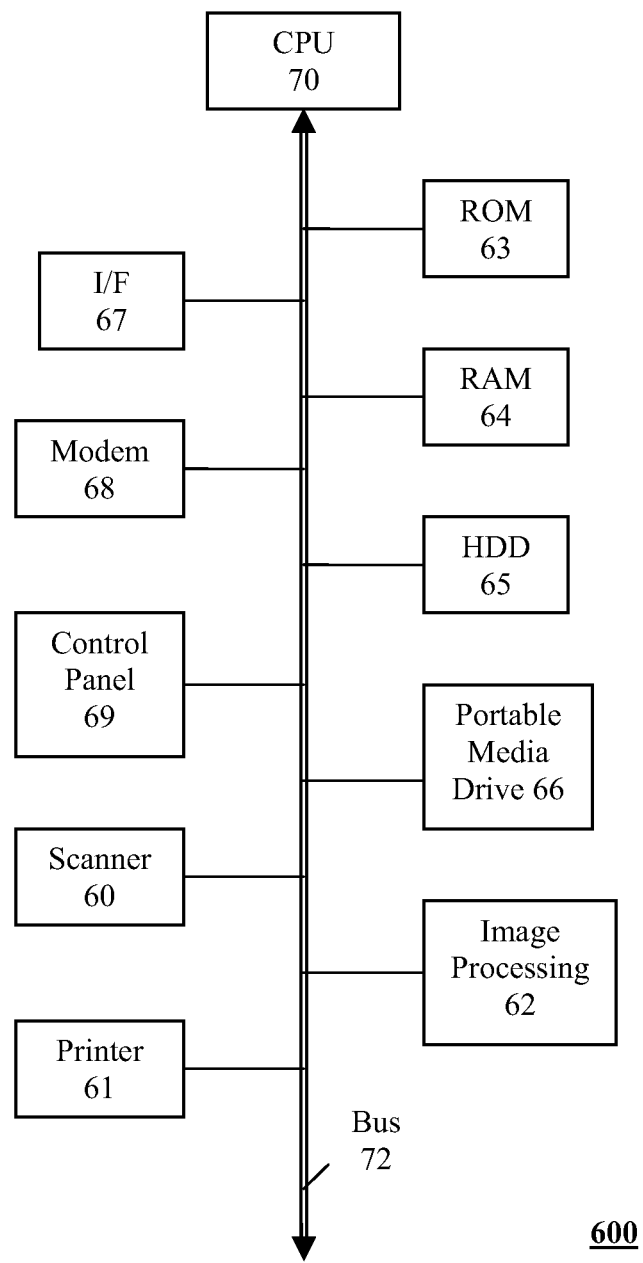
FIG. 6 shows a block diagram of an exemplary configuration of a multi-function device that can be used to implement an image processing apparatus, such as image processing apparatus 17 of FIG. 1.

The determination part 17b of the image processing apparatus 17 is configured to receive color image data for a color image. As one example, the image processing apparatus may include a scanner part configured to scan a hardcopy of the color image and thereby generate the color image data for the color image, where the color image data is then forwarded to the determination part 17b. For example, FIG. 6 shows a block diagram of an exemplary configuration of a multi-function device 600 that can be used to implement an image processing apparatus, such as image processing apparatus 17 of FIG. 1, where the scanner 60 of multi-function device 600 may scan a hardcopy of the color image and/or generate the color image data for the color image.

Alternatively, a communication part of the image processing apparatus 17 may receive the color image data for the color image as a data transmission (e.g., email, FAX, SMS, text message, etc.) via a network to which the image processing apparatus 17 is connected to. For example, FIG. 5 shows a block diagram of an exemplary configuration of a computer 500 that can be used to implement an image processing apparatus, such as image processing apparatus 17 of FIG. 1, where the network interface 53 of computer 500 may receive the color image data for the color image as a data transmission (e.g., email, FAX, SMS, text message, etc.) via a network to which the computer 500 is connected to.

Figure 3:
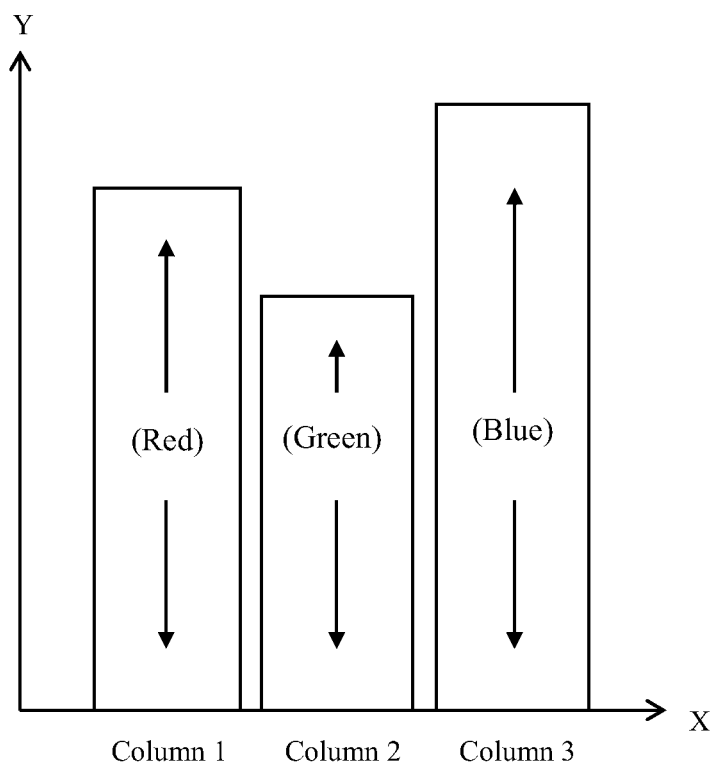
FIG. 3 illustrates an example of a color image including a color that is homogeneous in a two-dimensional area of the color image.

An example of a color image (corresponding to the color image data received by the determination part 17b) is illustrated in FIG. 3, where the color image includes one or more color portions. The color image illustrated in FIG. 3 is an example of a color chart (e.g. bar graph) for use during a presentation. In particular, the chart includes three columns each being a different solid color. For example, the column labeled "Column 1" is a solid red color, the column labeled "Column 2" is a solid green color, and the column labeled "Column 3" is a solid blue color, as seen in FIG. 3.

The determination part 17b is further configured to determine one or more two-dimensional areas of the color image, where each two-dimensional area has a color that is homogeneous in the two-dimensional area. According to this exemplary embodiment, the determination part may disregard any areas of the color image where monochrome colors such as black and white are present. For example, referring to the example of the color image illustrated in FIG. 3, the determination part 17b may determine that the color red is homogeneous in the two-dimensional dimensional area corresponding to column 1, or determine that the color green is homogeneous in the two-dimensional area corresponding to column 2, or determine that the color blue is homogeneous in the two-dimensional area corresponding to column 3. There are many procedures by which the determination part 17b may determine that a color is homogeneous in a two-dimensional area of a color image. One non-limiting example of such a procedure is discussed, infra, with reference to FIGS. 8 and 9A-9B.

After the determination part 17b has determined a two-dimensional area of the color image having a particular color that is homogeneous in the two-dimensional area, the determination part 17b determines, based on the color conversion information maintained by the maintenance part 17a, a first line pattern corresponding to the particular color that is homogeneous in the two-dimensional area.

The following are some examples illustrating how the determination part determines that a first line pattern corresponds to a particular color that is homogeneous in a two-dimensional area of a color image, with reference to the exemplary color image illustrated in FIG. 3 and the exemplary color conversion information illustrated in FIG. 2. For example, after the determination part determines that the two-dimensional area corresponding to "Column 1" of the color image of FIG. 3 includes the color red that is homogeneous in the two-dimensional area, the determination part may refer to the color conversion information of FIG. 2 to determine that the horizontal line pattern corresponds to the color red. As another example, after the determination part determines that the two-dimensional area corresponding to "Column 2" of the color image of FIG. 3 includes the color green that is homogeneous in the two-dimensional area, the determination part may refer to the color conversion information of FIG. 2 to determine that the vertical line pattern corresponds to the color green. As another example, after the determination part determines that the two-dimensional area corresponding to "Column 3" of the color image of FIG. 3 includes the color blue that is homogeneous in the two-dimensional area, the determination part may refer to the color conversion information of FIG. 2 to determine that the diagonal line pattern corresponds to the color blue.

The processing part 17c of the image processing apparatus 17 is configured to modify the color image by replacing the color portions of the color image with corresponding line patterns. More specifically, the processing part may modify a two-dimensional colored area/portion of the color image (at one point having a specific color that is homogeneous in the two-dimensional portion), by replacing the colored portion with a monochrome (e.g. grayscale) line pattern corresponding to the specific color of the colored portion. If the line patterns stored in the color conversion information identify pixel data corresponding to the line pattern, the processing part 17c may edit the image data of the color image to include the pixel data corresponding to the line pattern instead of the pixel data corresponding to the color portions. The processing part performs the modification on each two-dimensional colored area/portion of the color image and, as a result, the processing part generates a converted image.

Figure 4:
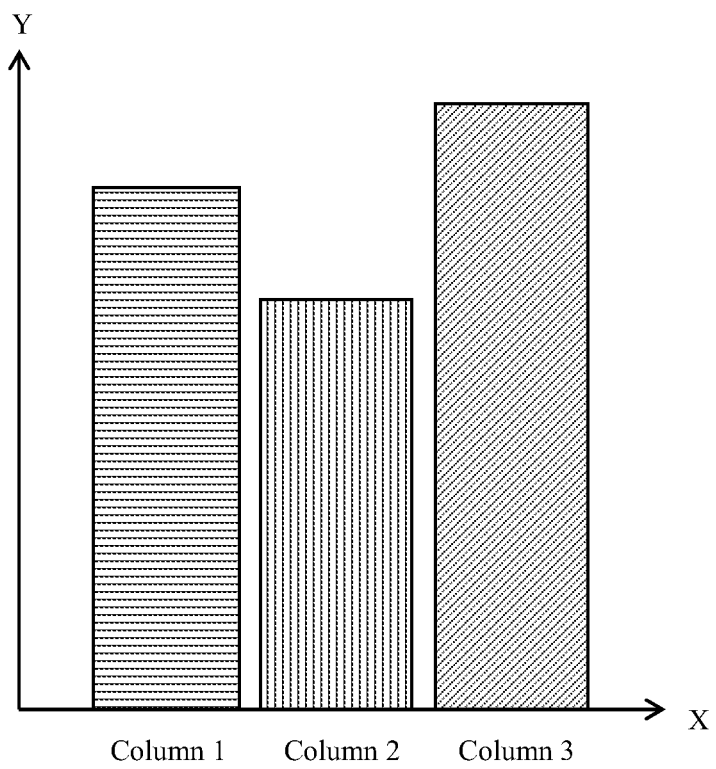
FIG. 4 illustrates an example of an image that has been modified by having a color in a two-dimensional area of the color image being replaced with a line pattern, according to an exemplary embodiment.

FIG. 4 illustrates an example of such a converted image, which is generated based on the exemplary color image in FIG. 3 and the color conversion information of FIG. 2.

According to the examples of FIGS. 2-4, since the determination part 17b has determined that the color red is homogeneous in the two-dimensional area corresponding to "Column 1" in the color image of FIG. 3, and the determination part has determined that the horizontal line pattern corresponds to the color red (based on the color conversion information of FIG. 2 as maintained by the maintenance part 17a), the processing part has replaced the red color portion of the original color image with the horizontal line pattern, as illustrated in FIG. 4. Likewise, since the determination part 17b has determined that the color green is homogeneous in the two-dimensional area corresponding to "Column 2" in the color image of FIG. 3, and the determination part has determined that the vertical line pattern corresponds to the color green (based on the color conversion information of FIG. 2 as maintained by the maintenance part 17a), the processing part has replaced the green color portion of the original color image with the vertical line pattern, as illustrated in FIG. 4. Similarly, since the determination part 17b has determined that the color blue is homogeneous in the two-dimensional area corresponding to "Column 3" in the color image of FIG. 3, and the determination part has determined that the diagonal line pattern corresponds to the color blue (based on the color conversion information of FIG. 2 as maintained by the maintenance part 17a), the processing part has replaced the blue color portion of the original color image with the diagonal line pattern, as illustrated in FIG. 4.

Thus, according to this exemplary embodiment, the image processing apparatus receives color image data for a color image, and modifies the color image by replacing one or more colored portions with corresponding portions having monochrome (e.g. black, white, etc.) line patterns. Thus, the modified image may be stored, transmitted or processed while consuming less storage, network or processing resources. Similarly, the modified image may be printed or outputted by consuming less printer resources, toner resources, etc.

The image processing apparatus of this disclosure may be realized by a computer program product including a computer-usable, non-transient medium (such as a disk storage apparatus) having instructions tangibly embodied therein that are executed by a computer. Thus, it should be understood that the image processing apparatus may be executed on a computer. The image processing may in fact be performed, at least in part, on a client terminal and/or network-connected device.

The image processing apparatus may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

FIG. 5 shows an exemplary constitution of a image processing apparatus 500 as a computer, for example, that can be configured through software to provide the image processing apparatus 17 of FIG. 1. As shown in FIG. 5, the image processing apparatus 500 includes a controller (or central processing unit) 51 that communicates with a number of other components, including memory or storage part 52, network interface 53, display 54 and operation panel 55, by way of a system bus 59.

The image processing apparatus 500 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In image processing apparatus 500, the controller executes program code instructions that controls device operations. The program code instructions may be stored in memory/storage 52, which may be a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives, and so forth The display part 54 includes a display screen that displays information to the user of the device 500. The display screen can be any of various conventional displays (such as a liquid crystal display, a plasma display device, a cathode ray tube display, etc.), or may be equipped with a touch sensitive display (for example, liquid crystal display), and configured to provide the GUI based on information input by an operator of the device, so as to allow the operator to conveniently take advantage of the services provided by the system. The operation panel 55 may include a keyboard with keys for inputting information or requesting various operations. Alternatively, the operation panel 55 and/or the display 54 may be operated by a keyboard, a mouse, a remote control, touching the display screen of the display 54, voice recognition, or eye-movement tracking, or a combination thereof.

Other aspects of the controller 51, memory/storage 52, network interface 53, display 54 and keyboard 55 are conventional, and therefore in order to avoid occluding the inventive aspects of this disclosure, such conventional aspects will not be discussed in detail herein.

The image processing apparatus 500 includes the network interface 53 for communications through a network. However, it should be appreciated that the subject matter of this disclosure is not limited to such configuration. For example, the image processing apparatus 500 may communicate with client terminals through direct connections and/or through a network to which some components are not connected. As another example, the image processing apparatus 500 need not be provided by a server that services terminals, but rather may communicate with the devices on a peer basis, or in another fashion.

As mentioned above, image processing apparatus 17 is not limited to a server or computer, but can be manifested in any of various devices.

An example of a configuration of a multi-function device 600, which can be used to implement an image processing apparatus such as image processing apparatus 17 of FIG. 1, is shown schematically in FIG. 6. Device 600 includes a central processing unit (CPU) 70, and various elements connected to the CPU 70 by an internal bus 72. The CPU 70 services multiple tasks while monitoring the state of the device 600. The elements connected to the CPU 70 include a scanner unit 60, a printer unit 61, an image processing device 62, a read only memory (for example, ROM, PROM, EPROM, EEPROM, etc.) 63, a random access memory (RAM) 64, a hard disk drive (HDD) 65, portable media (for example, floppy disk, optical disc, magnetic discs, magneto-optical discs, semiconductor memory cards, etc.) drives 66, a communication interface (I/F) 67, a modem unit 68, and an operation panel 69.

Program code instructions for the device 600 can be stored on the read only memory 63, on the HDD 65, or on portable media and read by the portable media drive 66, transferred to the RAM 64 and executed by the CPU 70 to carry out the instructions. These instructions can include the instructions to the device to perform specified ones of its functions to control the operation panel 69 and the image processing unit 62 of the device 600.

The operation panel 69 includes a display screen that displays information allowing the user of the device 600 to operate the device 600. The display screen can be any of various conventional displays (such as a liquid crystal display, a plasma display device, a cathode ray tube display, etc.), but is preferably equipped with a touch sensitive display (for example, liquid crystal display), and configured to provide the GUI based on information input by an operator of the device, so as to allow the operator to conveniently take advantage of the services provided by the system. The display screen does not need to be integral with, or embedded in, the operation panel 69, but may simply be coupled to the operation panel by either a wire or a wireless connection. The operation panel 69 may include keys for inputting information or requesting various operations. Alternatively, the operation panel 69 and the display screen may be operated by a keyboard, a mouse, a remote control, touching the display screen, voice recognition, or eye-movement tracking, or a combination thereof. The device 600 is a multifunction device (with scanner, printer and image processing) and in addition can be utilized as a terminal to download documents from a network.

Additional aspects or components of the device 600 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 7:
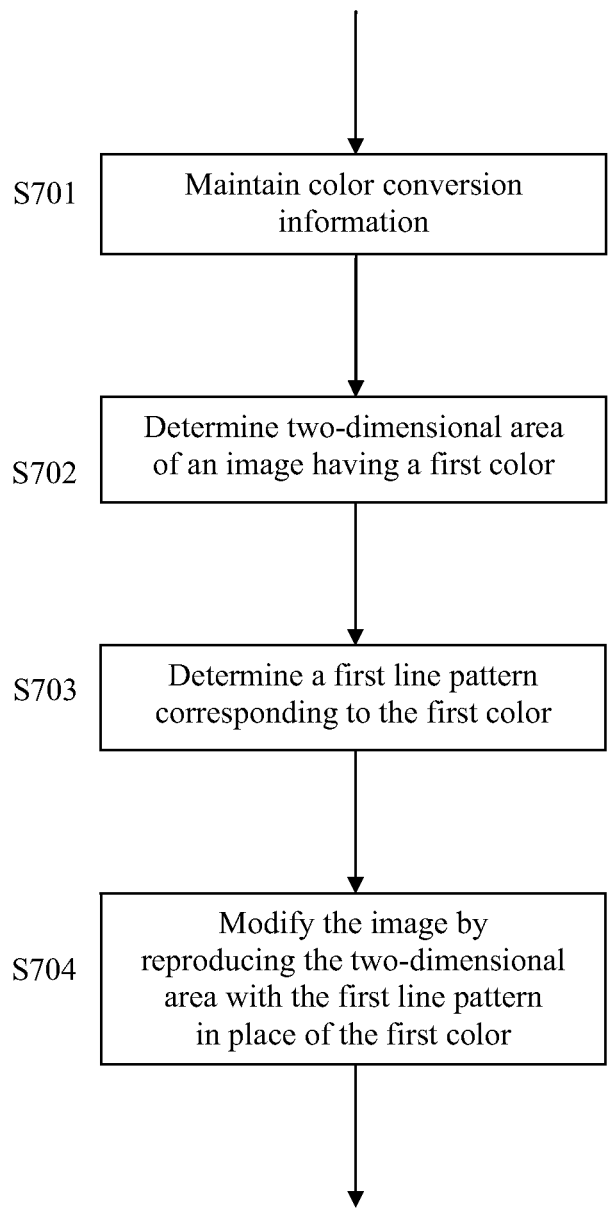
FIG. 7 shows a flowchart of a method performed by an image processing apparatus, such as image processing apparatus 17 illustrated in FIG. 1, according to an exemplary embodiment.

Turning now to FIG. 7, there is shown a flowchart of a method performed by an image processing apparatus (such as image processing apparatus 17 illustrated in FIG. 1) according to an exemplary embodiment.

In S701, the image processing apparatus maintains color conversion information mapping each of a plurality of colors to a corresponding line pattern. An example of color conversion information is illustrated in FIG. 2. In S702, the image processing apparatus determines a two-dimensional area of a color image having a first color that is homogeneous in the two-dimensional area. FIG. 3 illustrates an example of such a color image including two-dimensional areas (the columns labeled "Column 1", "Column 2", and Column 3") having colors (red, green and blue, respectively) that are homogeneous in the two-dimensional areas. In S703, the image processing apparatus determines, based on the color conversion information maintained in S701, a first line pattern corresponding to the first color. Finally, in S704, the image processing apparatus modifies the image by reproducing the two-dimensional area with the first line pattern corresponding to the first color (as determined in S703) in place of the first color, to thereby generate a converted image. An example of such a converted image is illustrated in FIG. 4.

As described above, there are many procedures by which the determination part 17b may determine that a color is homogeneous in a two-dimensional area of a color image. A non-limiting example of such a procedure is now discussed, with reference to FIGS. 8 and 9A-9B.

In particular, the determination part 17b may determine a two-dimensional area of an image having a homogeneous color therein by, for example, determining the color of each pixel in the color image, and analyzing the relationships between the color of a given pixel and the color of the pixels surrounding the given pixel. The determination part may repeat this procedure for each pixel in the color image.

Figure 8:
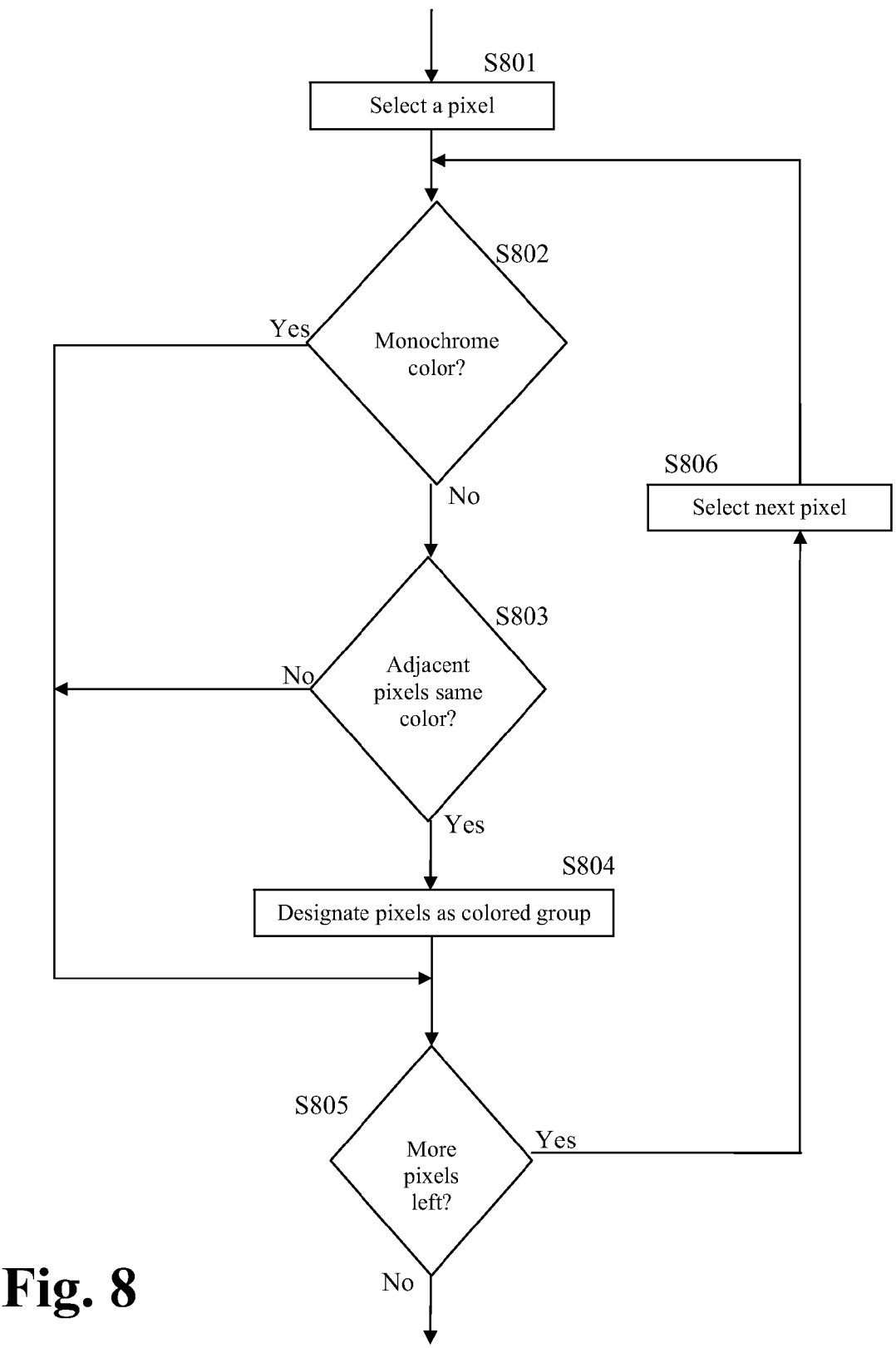
FIG. 8 shows a flowchart of a method performed by a an image processing apparatus, such as image processing apparatus 17 illustrated in FIG. 1, according to an exemplary embodiment.

This process is described in more detail with reference to the flowchart of FIG. 8. The determination part first selects a pixel (S801), and then checks whether the pixel is a monochrome color in S802 (e.g. checks whether the pixel is for example, white, black, etc). The determination part may determine a color of each pixel in the color image, such as by examining the color image data corresponding to each pixel (which generally describes the color of that pixel by referring to the corresponding values of the Red-Green-Blue primary color components). Such methods for determining the color of an individual pixel are well understood by those skilled in the art, and will not be described herein in the interests of brevity.

If it is determined that the pixel is a monochrome color (Yes, S802), then the flow proceeds to S805. If the pixel is a non-monochrome color (No, S802), the determination part determines if a predetermined number of the pixels adjacent to the selected pixel have the same non-monochrome color (S803). If the same non-monochrome color is not in a predetermined number of adjacent pixels (No, S802), then the flow proceeds to S805. If a predetermined number of adjacent pixels have the same non-monochrome color (Yes, S803), then the determination part designates all these connected pixels having the same non-monochrome color collectively as a two-dimensional colored group/area having a color that is homogeneous in the two-dimensional area (S804). The predetermined number may be selected in order to control the size of the two-dimensional area. For example, if the predetermined number is small, then small groups of similarly colored pixels and/or thin lines of colored pixels may be ignored and will not be designated as a colored group of pixels.

In S805, the determination part determines whether more pixels are remaining in the color image and, if so (Yes, S805) the determination part selects the next pixel (S806) and the flow returns to S802. If the determination part determines that more pixels are not remaining in the color image (No, S805), then the flow ends.

Figure 9A:
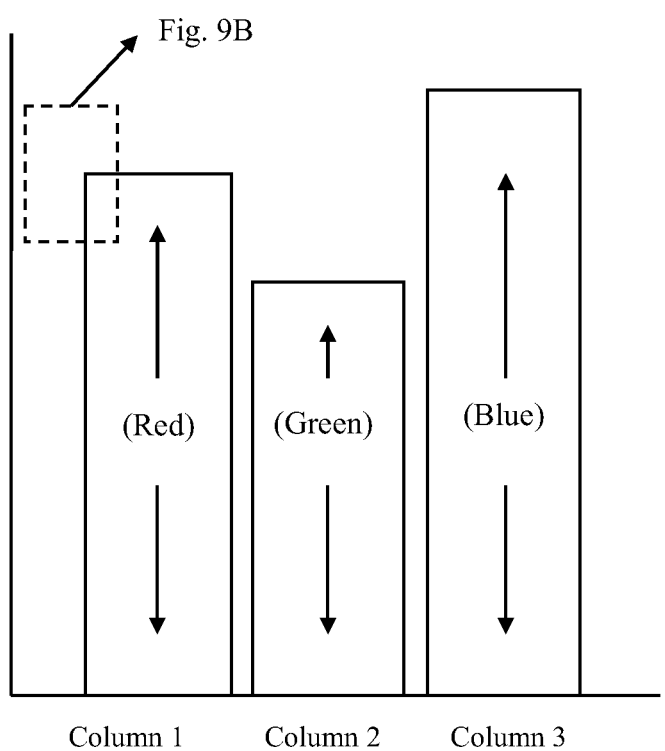

An example of this processes being performed on the color image of FIG. 3 is illustrated in FIGS. 9A and 9B. FIG. 9A illustrates the same color image as that illustrated in FIG. 3, except that FIG. 9A highlights a portion of the color image in the dashed square, which is depicted in much greater detail in FIG. 9B in order to better illustrate the method being performed by the determination part. It should be noted that the same procedure is applied to the entire portion of the color image data illustrated in FIG. 9A. As seen in FIG. 9B, the pixels at positions (6,0), (6,1) . . . (6,4) are all red, the pixels at positions (7,0), (7,1) . . . (7,4) are all red, the pixels at positions (8,0), (8,1) . . . (8,4) are all red, and the pixels at positions (9,0), (9,1) . . . (9,4) are all red. All the remaining pixels illustrated in FIG. 9B are white.

If the determination part selects the pixel at position (3,4), for example, then determination part determines that pixel (3,4) is a monochrome color (S802, Yes), and the determination part will proceed to select another pixel, if available. On the other hand, if the determination part selects the pixel at position (7,2), the determination part determines that pixel (7,2) is red, and determines that the adjacent and/or chain of connected pixels (6,0) . . . (6,4), (7,0), (7,1), (7,3), (7,4), (8,0) . . . (8,4) and (9,0) . . . (9,4) are also all red. Thus, the determination part designates the group of connected pixels (6,0) . . . (6,4), (7,0) . . . (7,4), (8,0) . . . (8,4) and (9,0) . . . (9,4) collectively as a two-dimensional colored group/area having a color (red) that is homogeneous in the two-dimensional area.

Figure 10:
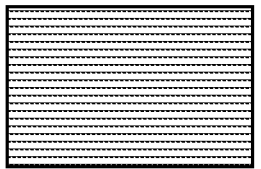
FIG. 10 shows an example of a table registering color conversion information, according to an exemplary embodiment.
Figure 10:
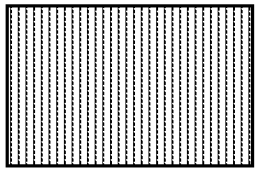
Figure 10:
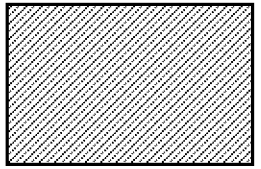
Figure 10:
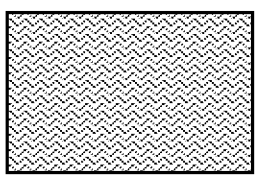
Figure 10:
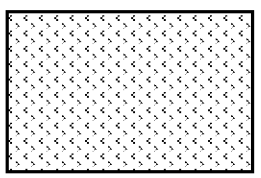
Figure 10:
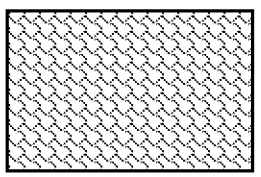

According to this exemplary embodiment, each of the line patterns corresponding to the each of the plurality of different colors is a different and unique line pattern, as illustrated in exemplary color conversion information of FIG. 2. As illustrated in FIG. 2, each of the line patterns may include only a plurality of parallel lines oriented in a specific direction, such as a vertical direction, horizontal direction, diagonal direction, etc. However, other unique line patterns (that include non-parallel lines) may be used, such as those illustrated in FIG. 10.

Turning now to FIGS. 11-15, there is described another exemplary embodiment. According to this exemplary embodiment, after the determination part 17b of the image processing apparatus 17 determines a two-dimensional area of a color image having a first color that is homogeneous in the two-dimensional area, the determination part may determine that the first color can be represented as a combination of two or more other colors in accordance with an additive color scheme (such as the Red-Green-Blue primary color additive scheme described below). The determination part may then determine that the first line pattern corresponding to the first color is a combination of line patterns of the two or more other colors. The processing part 17c of the image processing apparatus 17 may then modify the color image by replacing the color portions of the color image having the first color with the first line pattern.

Figure 11:
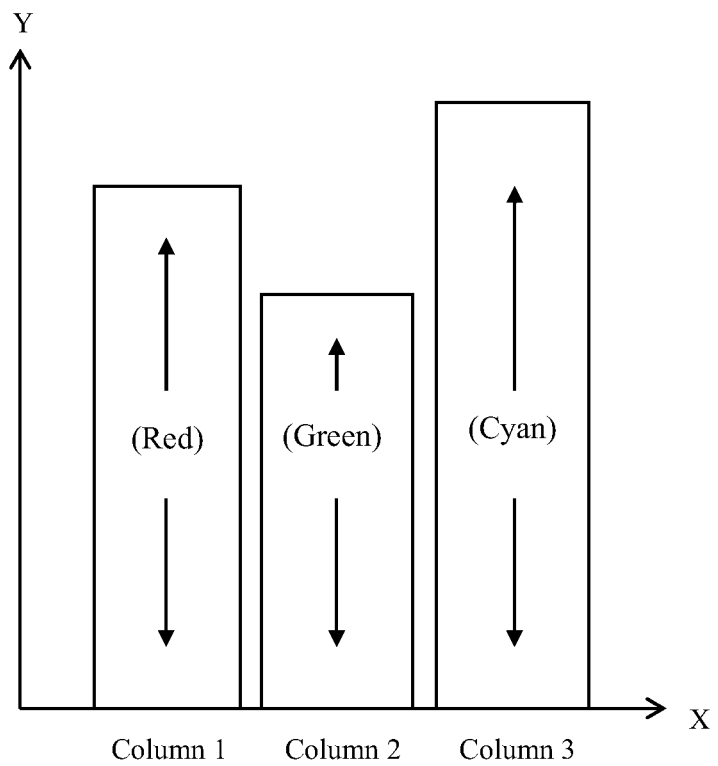
FIG. 11 illustrates an example of a color image including a color that is homogeneous in a two-dimensional area of the color image.

FIG. 11 depicts an example of a color image similar to the color image illustrated in FIG. 2, except that the color of the column labeled "Column 3" is cyan and not blue. If the maintenance part 17a maintains the color conversion information illustrated in FIG. 2 (which does not already include a line pattern for the color cyan), the determination part 17b may refer to additive color information, such as that illustrated in FIG. 12, in order to determine that the color cyan can be represented as a combination of green and blue, the color magenta can be represented as a combination of red and blue, and the color yellow can be represented as a combination of red and green. The additive color scheme described in FIG. 12 is the Red-Green-Blue additive color model widely used in the art, in which the primary colors (red, green and blue) are added in various combinations in order to generate an array of colors.

Figure 13:
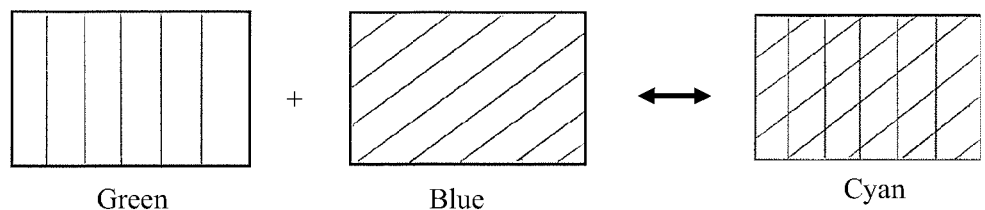
FIG. 13 shows an example of how a particular line pattern may be a combination of the respective line patterns of other colors, according to an exemplary embodiment.
Figure 13:
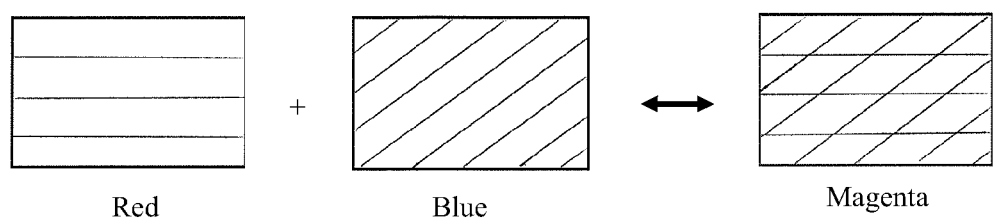
Figure 13:
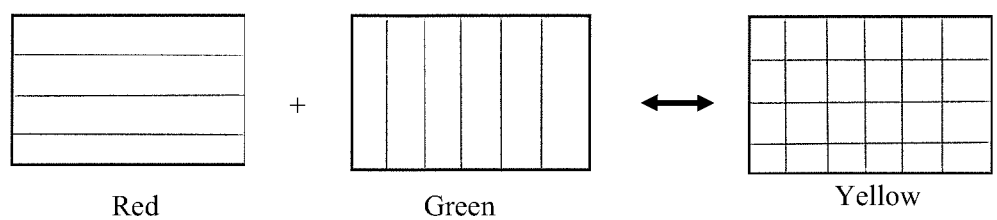
Figure 14:
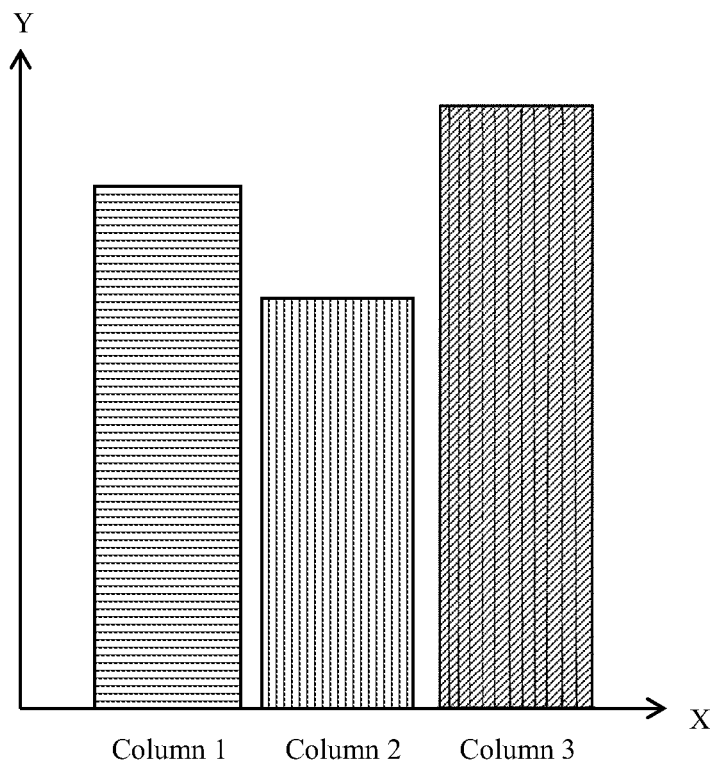
FIG. 14 illustrates an example of an image that has been modified by having a color in a two-dimensional area of the color image being replaced with a line pattern, according to an exemplary embodiment.

Since the color cyan can be represented as a combination of green and blue, the determination part may then determine that the line pattern corresponding to the color cyan is in fact a combination of the line pattern of the color green and the line pattern of the color blue, as illustrated in FIG. 13. The combinations illustrated in FIG. 13 are direct overlaps of two other line patterns, but other possible combinations of the two other line patterns may be used. Thereafter, the processing part 17c of the image processing apparatus 17 may then modify the color image by replacing the color portion of the color image having the color cyan with the combination line pattern (generated by combining the line patterns for green and blue), as illustrated in FIG. 14.

Figure 15:
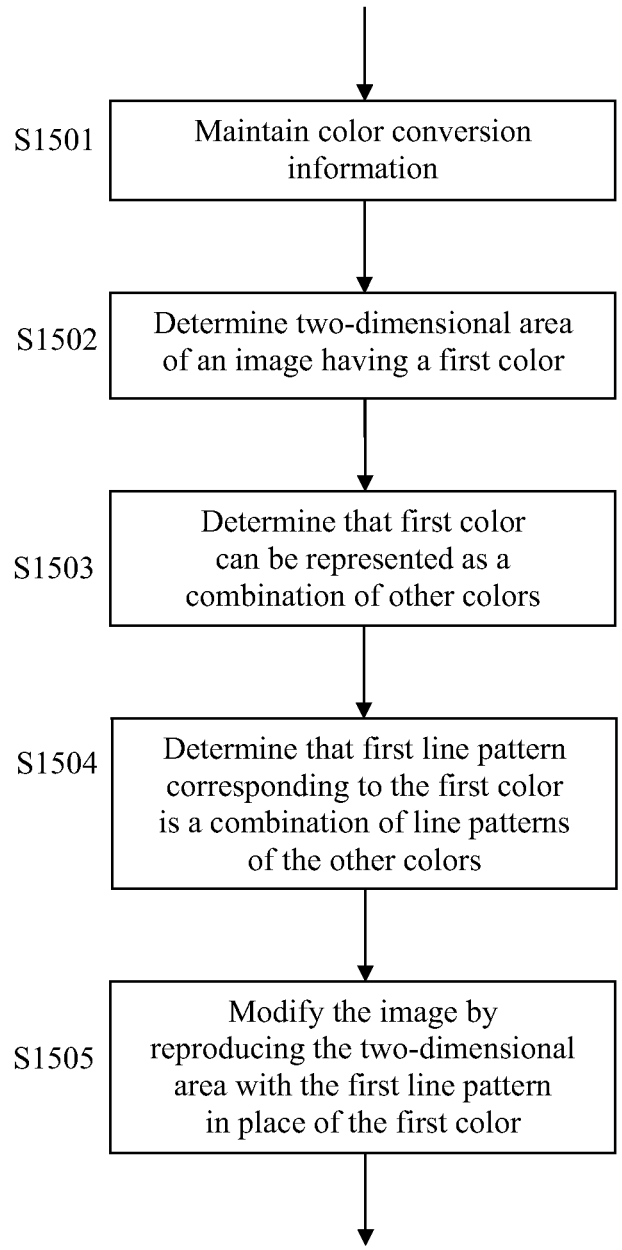
FIG. 15 shows a flowchart of a method performed by an image processing apparatus, such as image processing apparatus 17 illustrated in FIG. 1, according to an exemplary embodiment.

Turning now to FIG. 15, there is shown a flowchart of a method performed by an image processing apparatus (such as image processing apparatus 17 illustrated in FIG. 1) according to this exemplary embodiment.

In S1501, the image processing apparatus maintains color conversion information mapping each of a plurality of colors to a corresponding line pattern. An example of color conversion information is illustrated in FIG. 2. In S1502, the image processing apparatus determines a two-dimensional area of a color image having a first color that is homogeneous in the two-dimensional area. FIG. 11 illustrates an example of such a color image including two-dimensional areas (the columns labeled "Column 1", "Column 2", and Column 3") having colors (red, green and cyan, respectively) that are homogeneous in the two-dimensional areas.

In S1503, the image processing apparatus determines that a first color in the color image (such as cyan in the exemplary color image of FIG. 11) can be represented as a combination of two or more other colors (such as green and blue) in accordance with an additive color scheme. FIG. 12 illustrates an example of information that indicates how a color can be represented as a combination of two or more other colors in accordance with a red-green-blue primary color additive scheme. In S1504, the image processing apparatus determines that the first line pattern corresponding to the first color may be a combination of the line patterns of the two or more other colors determined in S1503. FIG. 13 illustrates examples of how a line pattern corresponding to a particular color, such as cyan, may be represented as a combination of the line patterns of the two or more other colors, such as the line patterns of green and blue. Finally, in S1505, the image processing apparatus modifies the image by reproducing the two-dimensional area with the first line pattern corresponding to the first color (as determined in S1504) in place of the first color, to thereby generate a converted image. An example of such a converted image is illustrated in FIG. 14.

While the previous embodiments have described systems, apparatuses and methods for converting one or more color portions of a color image into a monochrome line pattern portion, the aspects of this disclosure may be similarly applied to systems, apparatuses and methods for converting one or more monochrome line pattern portions of an image into color portions. That is, according to another exemplary embodiment of this disclosure, the image processing apparatus 17 may in addition or instead be configured to perform the 'reverse' operation and replace homogeneous line patterns of an image with colored portions corresponding to the line patterns.

With reference to FIGS. 1-4, the maintenance part 17a of the apparatus 17 according to this embodiment maintains the same color conversion information as described previously, such as the color conversion information illustrated in FIG. 2 that maps each of a plurality of line patterns to a corresponding color.

The determination part 17b of the apparatus 17 according to this embodiment may receive an image including a two-dimensional area having a line pattern that is homogeneous in the two dimensional area. FIG. 4 illustrates an example of such an image, wherein the area corresponding to the column labeled "Column 1" includes a homogeneous horizontal line pattern, the area corresponding to the column labeled "Column 2" includes a homogeneous vertical line pattern, and the area corresponding to the column labeled "Column 3" includes a diagonal line pattern. The determination part 17b may determine the type of the line patterns by, for example, comparing the pixel image data of the image with sample line pattern pixel image data stored in the color conversion information (FIG. 2).

The determination part 17b then determines, based on the color conversion information maintained by the maintenance part 17a, a color corresponding to a line pattern in the image. For example, the determination part may refer to the color conversion information illustrated in FIG. 2 and determine that the color red corresponds to the horizontal line pattern (which is included in the column labeled "Column 1" in the exemplary image of FIG. 4). Likewise, the color green corresponds to the vertical line pattern (which is included in the column labeled "Column 2" in the exemplary image of FIG. 4). Similarly, the color blue corresponds to the diagonal line pattern (which is included in the column labeled "Column 3" in the exemplary image of FIG. 4).

The processing part 17c of the apparatus 17 according to this embodiment modifies the image by reproducing the two-dimensional area having the line pattern with the corresponding color in place of the line pattern. For example, the processing part may replace the horizontal line pattern of the image in FIG. 4 with a homogeneous red-colored two-dimensional area, and replace the vertical line pattern of the image in FIG. 4 with a homogeneous green-colored two-dimensional area, and replace the diagonal line pattern of the image in FIG. 4 with a homogeneous blue-colored two-dimensional area, to generate a converted image (which may appear similar to the image illustrated in FIG. 3).

Thus, according to this exemplary embodiment, an image that includes portions with line patterns can be modified, such that the portions with the line patterns are replaced with colored areas corresponding to the line patterns.

Figure 16:
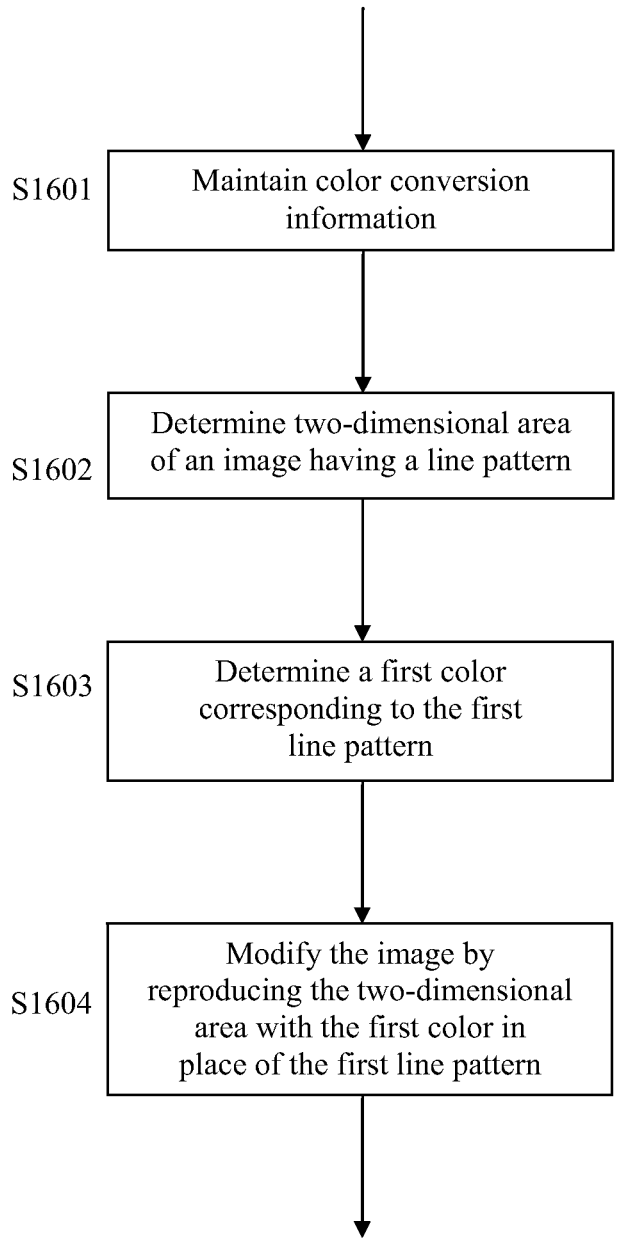
FIG. 16 shows a flowchart of a method performed by an image processing apparatus, such as image processing apparatus 17 illustrated in FIG. 1, according to another exemplary embodiment.

Turning now to FIG. 16, there is shown a flowchart of a method performed by an image processing apparatus (such as image processing apparatus 17 illustrated in FIG. 1) according to this exemplary embodiment.

In S1601, the image processing apparatus maintains color conversion information mapping each of a plurality of colors to a corresponding line pattern. An example of color conversion information is illustrated in FIG. 2. In S1602, the image processing apparatus determines a two-dimensional area of an image having a first line pattern that is homogeneous in the two-dimensional area. FIG. 4 illustrates an example of such an image including two-dimensional areas (the columns labeled "Column 1", "Column 2", and Column 3") having line patterns (horizontal line pattern, vertical line pattern and diagonal line pattern, respectively) that are homogeneous in the two-dimensional areas. In S1603, the image processing apparatus determines, based on the color conversion information maintained in S1601, a first color corresponding to a first line pattern. Finally, in S1604, the image processing apparatus modifies the image by reproducing the two-dimensional area with the first color corresponding to the first line pattern (as determined in S1603) in place of the first line pattern, to thereby generate a converted image. Such a converted image may appear similar to the image illustrated in FIG. 3.

The current embodiment may also be modified to incorporate other aspects of this disclosure. For example, according to another aspect of this disclosure previously described above with reference to FIGS. 11-14, if a particular color may be represented by a combination of other colors in accordance with an additive color scheme, then the line pattern of that particular color may be the combination of the line patterns of the other colors. The 'reverse' operation of this system and process may be utilized, in accordance with the current embodiment.

That is, the determination part 17b of the apparatus 17 of this embodiment may be configured to determine, based on the color conversion information, that a line pattern in a received image is a combination of the respective line patterns of two or more other colors. For example, if the received image is the image illustrated in FIG. 14, the determination part may determine that the line pattern corresponding to the column labeled "Column 3" is a combination of a vertical line pattern and a diagonal line pattern, as illustrated in FIG. 13. The determination part 17b may then refer to the color conversion information stored in the maintenance part 17a, such as the color conversion information illustrated in FIG. 2, to determine that the vertical line pattern corresponds to the color green, and the diagonal line pattern corresponds to the color blue.

Further, the determination part 17b of this embodiment may then determine that that the color corresponding to the line pattern is a combination of the two or more other colors in accordance with an additive color scheme. For example, if the determination part has determined that the line pattern of the column labeled "Column 3" in the image of FIG. 14 is a combination of the respective line patterns of the colors green and blue, then the determination part may determine (based on additive information such as that depicted in FIG. 12) that the combination of the colors green and blue represents the color cyan, in accordance with a red-green-blue primary color additive scheme. Thus, the determination part determines that the color cyan corresponds to the line pattern of the column labeled "Column 3"

Thereafter, the processing part 17c of the image processing apparatus 17 of this embodiment may modify the image by replacing a line pattern of the received image with the color corresponding to the line pattern. For example, the processing part may replace the line pattern of the column labeled "Column 3", in the image illustrated in FIG. 14, with a cyan-colored portion, as illustrated in FIG. 11.

Figure 17:
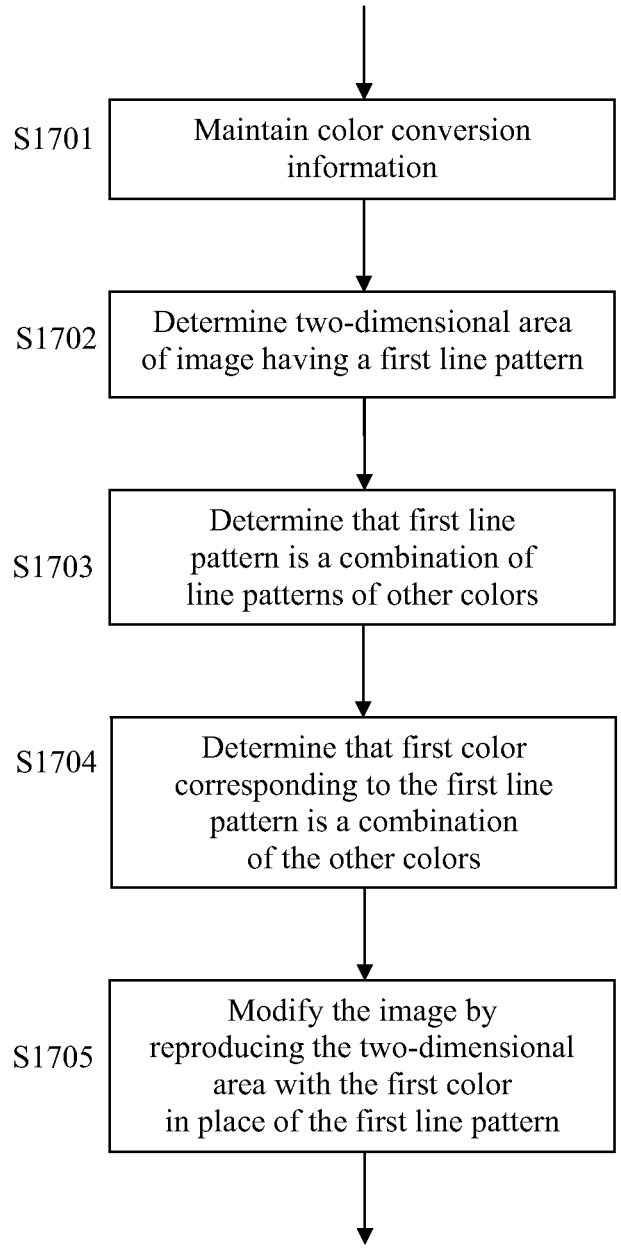
FIG. 17 shows a flowchart of a method performed by an image processing apparatus, such as image processing apparatus 17 illustrated in FIG. 1, according to another exemplary embodiment.

Turning now to FIG. 17, there is shown a flowchart of a method performed by an image processing apparatus (such as image processing apparatus 17 illustrated in FIG. 1) according to this exemplary embodiment.

In S1701, the image processing apparatus maintains color conversion information mapping each of a plurality of colors to a corresponding line pattern. An example of color conversion information is illustrated in FIG. 2. In S1702, the image processing apparatus determines a two-dimensional area of a color image having a first line pattern that is homogeneous in the two-dimensional area. FIG. 14 illustrates an example of such a color image including two-dimensional areas (the columns labeled "Column 1", "Column 2", and Column 3") having line patterns that are homogeneous in the two-dimensional areas.

In S1703, the image processing apparatus determines that a first line pattern in the color image (such as the line pattern in Column 3 in the exemplary image of FIG. 14) can be represented as a combination of the respective line patterns of two or more other colors (such as the vertical line pattern for green and the diagonal line pattern for blue). FIG. 13 illustrates examples of how a line pattern (corresponding to a particular color, such as cyan) may be represented as a combination of other line patterns of the two or more other colors (such as the line patterns of green and blue).

In S1704, the image processing apparatus determines that the first color corresponding to the first line pattern may be a combination of the two or more other colors (determined in S1703) in accordance with an additive color scheme. FIG. 12 illustrates additive information indicating how a color (such as cyan) may be represented as a combination of other colors (such as green and blue) in accordance with a conventional Red-Green-Blue additive color scheme. Finally, in S1705, the image processing apparatus modifies the image by reproducing the two-dimensional area with the first color corresponding to the first line pattern (as determined in S1704) in place of the first line pattern, to thereby generate a converted image. Such a converted image may appear as the color image illustrated in FIG. 11.

An exemplary scenario where the embodiments of this disclosure may be utilized is now described. In a situation where a user desires to print out a color document without using great resources, the use may utilize the first embodiment of this disclosure in order to print out an image including monochrome line patterns (corresponding to the color portions) in place of the color portions. Thereafter, the image with the line patterns may be scanned and, by using the aspects of another exemplary embodiment just described above, the 'reverse' operation may be performed in order to modify the image having the monochrome line patterns, and restore and obtain the original color image with the original color portions.

Figure 18A:
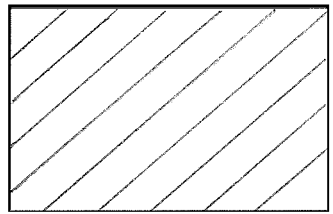
FIGS. 18A-18C shows examples of tables registering color conversion information, according to an exemplary embodiment.
Figure 18A:
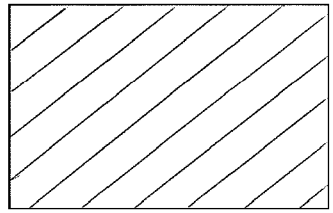
Figure 18A:
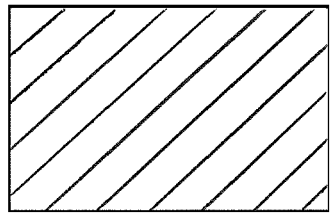
Figure 18B:
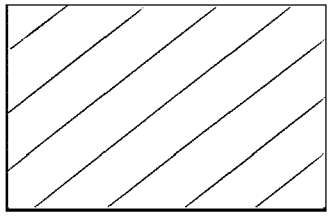
Figure 18B:
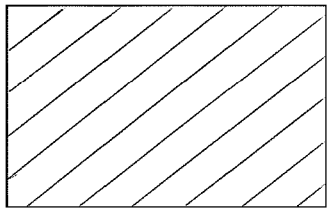
Figure 18B:
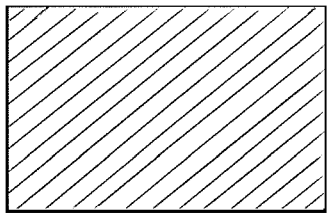
Figure 18C:
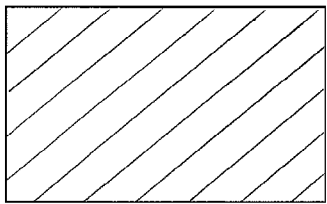
Figure 18C:
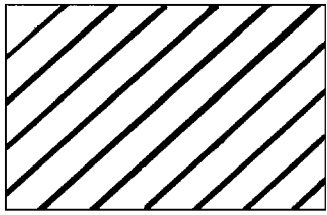
Figure 18C:
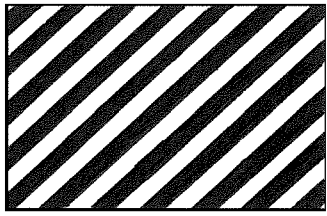
Figure 19:
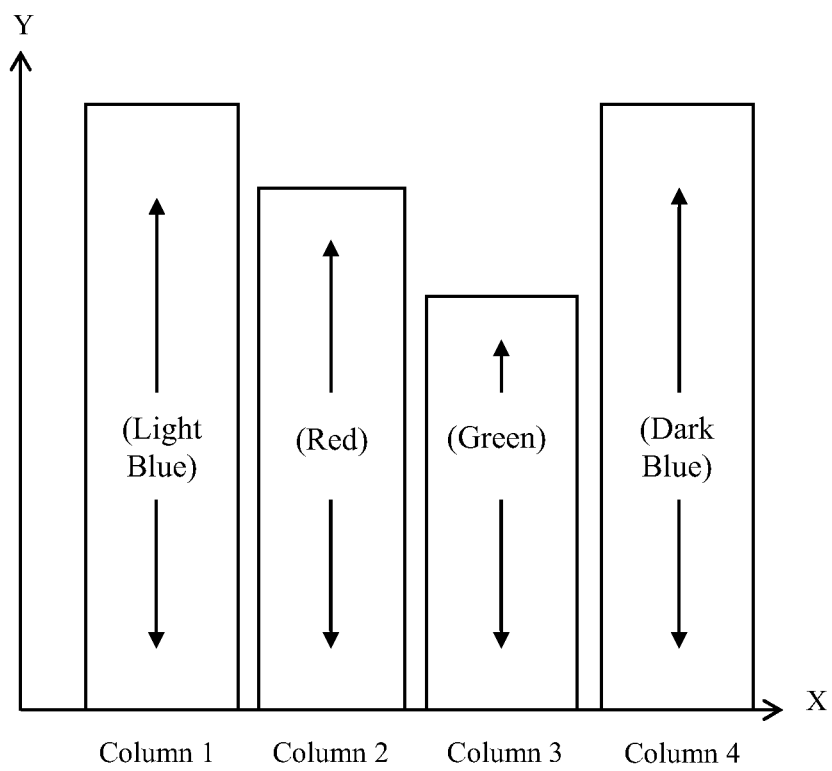
FIG. 19 illustrates an example of a color image including a light color that is homogeneous in a two-dimensional area of the color image and a dark color that is homogeneous in another two-dimensional area of the color image.
Figure 20A:
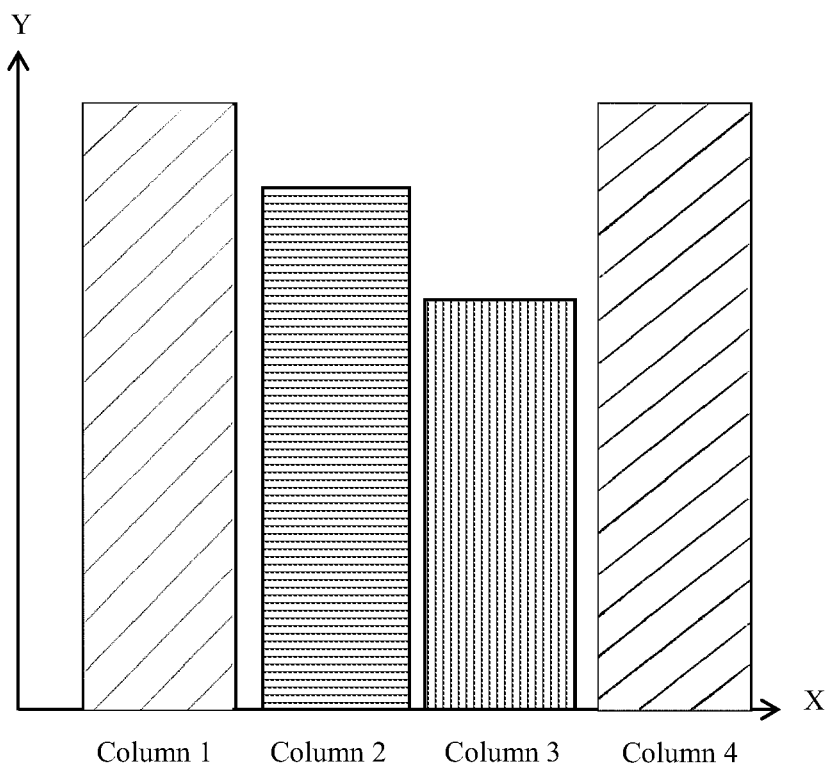
FIGS. 20A-20C illustrate examples of modified images that include line patterns, according to an exemplary embodiment.
Figure 20B:
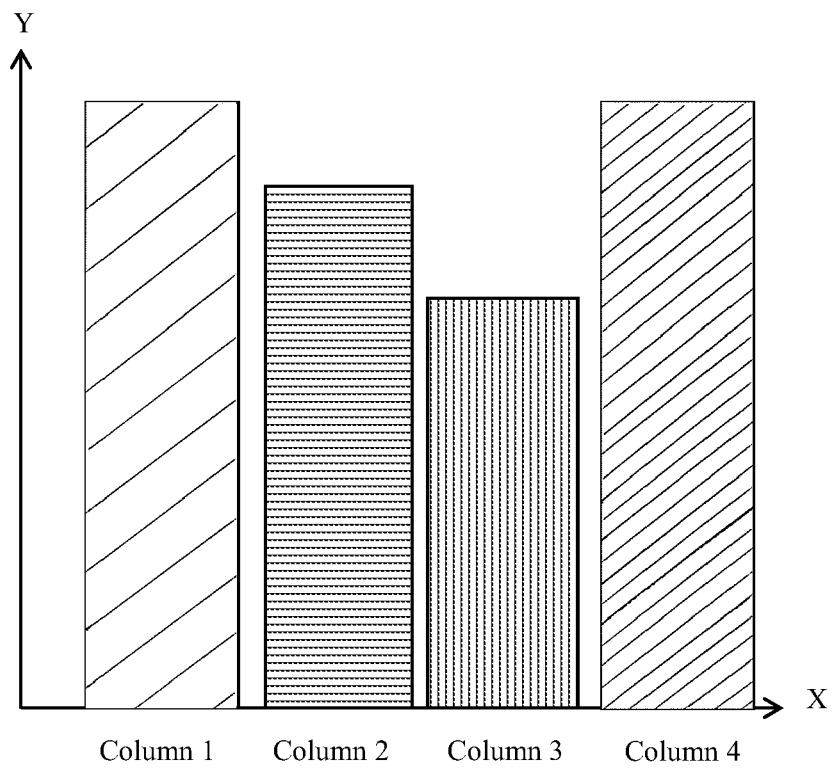
Figure 20C:
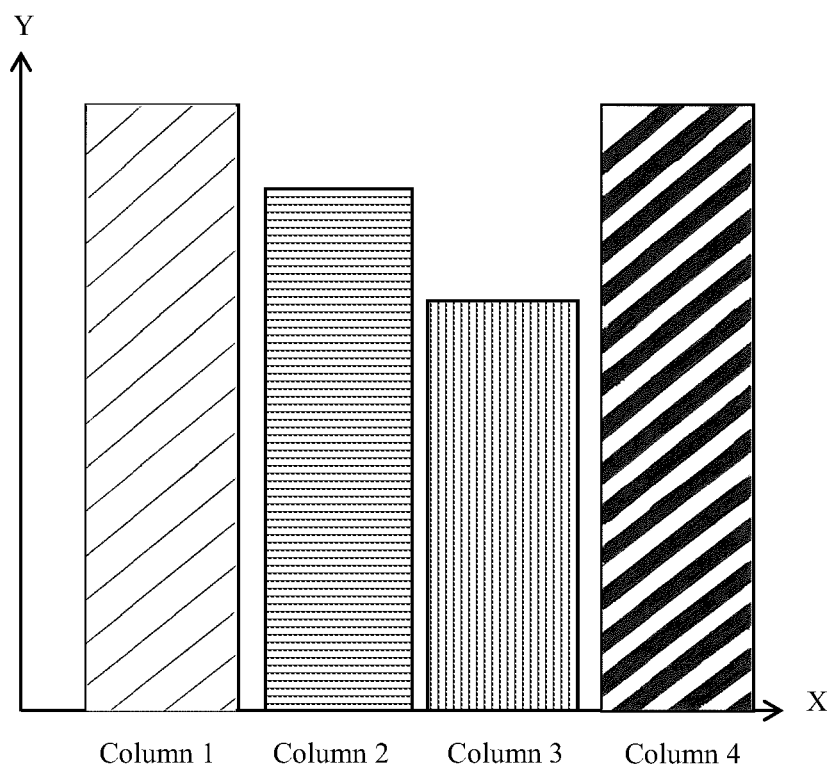

Turning now to FIGS. 18-20, there is described another exemplary embodiment. In the previous exemplary embodiments described above, each color in the color conversion information corresponds to a different monochrome grayscale line pattern. For example, as seen in the color conversion information of FIG. 2, the color red corresponds to a horizontal line pattern, the color green corresponds to a vertical line pattern and the color blue corresponds to a diagonal line pattern. According to this exemplary embodiment, each of different 'shades' or 'strengths' of a given color may have similar line patterns. For example, light blue, medium blue and dark blue may all have the diagonal line pattern. In addition, the line patterns for the different shades or strengths of the given color may differ in, for example, the monochromatic (e.g. grayscale) shade of the lines in the line pattern, the width of the lines in the line pattern, the distance between the lines in the line pattern, some combination of the above, etc.

For example, FIG. 18A illustrates an example of color conversion information that may be maintained by the maintenance part 17a of the image processing apparatus 17. As seen in FIG. 18A, the color conversion information identifies three shades or strengths of the color blue—that is, light blue, medium blue and dark blue. The color conversion information of FIG. 18A also identifies, for each of the shades of the color blue, a corresponding line pattern. In particular, in the exemplary color conversion information illustrated in FIG. 18A, the line patterns for the different shades of a given color differ in terms of the monochromatic (e.g. grayscale) shade of the lines in the line pattern. For example, the line pattern corresponding to light blue is a diagonal line pattern where the lines in the line pattern have a light gray color (i.e. light monochromatic grayscale shade). Moreover, the line pattern corresponding to medium blue is a diagonal line pattern where the lines in the line pattern have a medium gray color (i.e. medium monochromatic grayscale shade). The line pattern corresponding to dark blue is a diagonal line pattern where the lines in the line pattern have a dark gray color (i.e. dark monochromatic grayscale shade).

Thus, if the determination part 17b of the image processing apparatus 17 receives the exemplary color image illustrated in FIG. 19 (which includes a solid light blue color in the column labeled "Column 1" and a solid dark blue color in the column labeled "Column 4") then, the determination part may determine, based on the exemplary color conversion information of FIG. 18A, that the light-gray monochrome diagonal line pattern corresponds to the light blue color and the dark gray monochrome diagonal line pattern corresponds to the dark blue color. Thus, the processing part 17c of the image processing apparatus 17 may modify the image of FIG. 19 in order to produce the image of FIG. 20A, where each of the solid colors have been replaced with line patterns corresponding to each color, according to the aspects of this disclosure.

As another example, FIG. 18B illustrates another example of color conversion information that may be maintained by the maintenance part 17a of the image processing apparatus 17. As seen in FIG. 18B, the color conversion information identifies three shades or strengths of the color blue—that is, light blue, medium blue and dark blue. The color conversion information of FIG. 18B also identifies, for each of the shades of the color blue, a corresponding line pattern. In particular, in the exemplary color conversion information illustrated in FIG. 18B, the line patterns for the different shades of a given color differ in terms of the distance between the lines in the line pattern. For example, the line pattern corresponding to light blue is a diagonal line pattern where there is a large distance between the lines in the line pattern. Moreover, the line pattern corresponding to medium blue is a diagonal line pattern where there is a medium distance between the lines in the line pattern. The line pattern corresponding to dark blue is a diagonal line pattern where there is a small distance between the lines in the line pattern.

Thus, if the determination part 17b of the image processing apparatus 17 receives the exemplary color image illustrated in FIG. 19 (which includes a solid light blue color in the column labeled "Column 1" and a solid dark blue color in the column labeled "Column 4") then, the determination part may determine, based on the exemplary color conversion information of FIG. 18B, that the monochrome diagonal line pattern having a large distance between the lines corresponds to the light blue color and the monochrome diagonal line pattern having a small distance between the lines corresponds to the dark blue color. Thus, the processing part 17c of the image processing apparatus 17 may modify the image of FIG. 19 in order to produce the image of FIG. 20B, where each of the solid colors have been replaced with line patterns corresponding to each color, according to the aspects of this disclosure.

As another example, FIG. 18C illustrates another example of color conversion information that may be maintained by the maintenance part 17a of the image processing apparatus 17. As seen in FIG. 18C, the color conversion information identifies three shades or strengths of the color blue—that is, light blue, medium blue and dark blue. The color conversion information of FIG. 18C also identifies, for each of the shades of the color blue, a corresponding line pattern. In particular, in the exemplary color conversion information illustrated in FIG. 18C, the line patterns for the different shades of a given color differ in terms of the width of the lines in the line pattern. For example, the line pattern corresponding to light blue is a diagonal line pattern where the lines in the line pattern have a small width. Moreover, the line pattern corresponding to medium blue is a diagonal line pattern where the lines in the line pattern have a medium width. The line pattern corresponding to dark blue is a diagonal line pattern where the lines in the line pattern have a large width.

Thus, if the determination part 17b of the image processing apparatus 17 receives the exemplary color image illustrated in FIG. 19 (which includes a solid light blue color in the column labeled "Column 1" and a solid dark blue color in the column labeled "Column 4") then, the determination part may determine, based on the exemplary color conversion information of FIG. 18C, that the monochrome diagonal line pattern having lines with a small width corresponds to the light blue color and the monochrome diagonal line pattern having lines with a large width corresponds to the dark blue color. Thus, the processing part 17c of the image processing apparatus 17 may modify the image of FIG. 19 in order to produce the image of FIG. 20C, where each of the solid colors have been replaced with line patterns corresponding to each color, according to the aspects of this disclosure.

Figure 21:
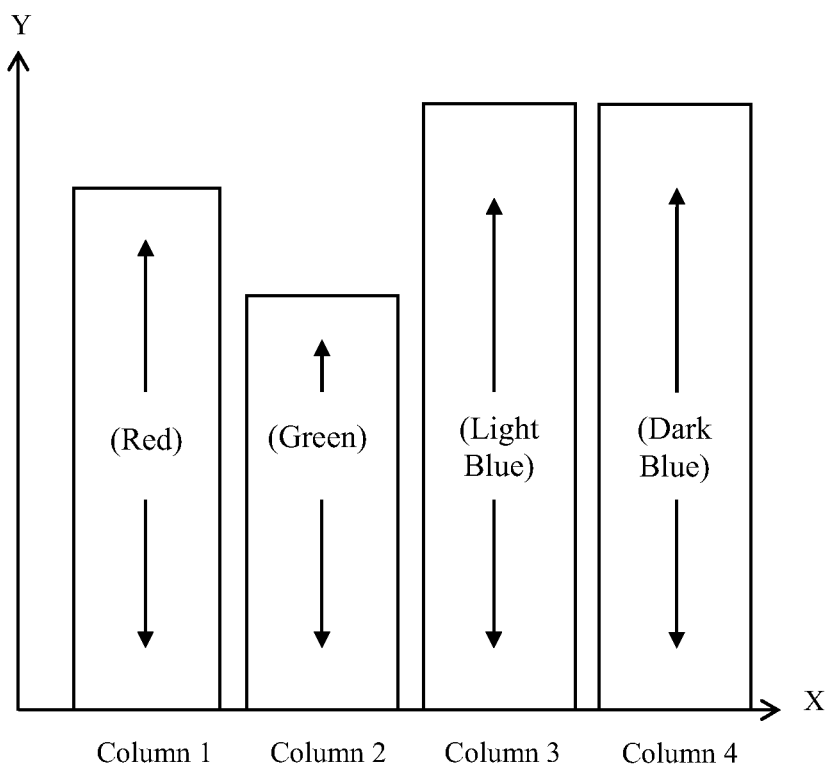
FIG. 21 illustrates an example of a color image including a light color that is homogeneous in a two-dimensional area of the color image and a dark color that is homogeneous in an adjacent two-dimensional area of the color image.
Figure 22A:
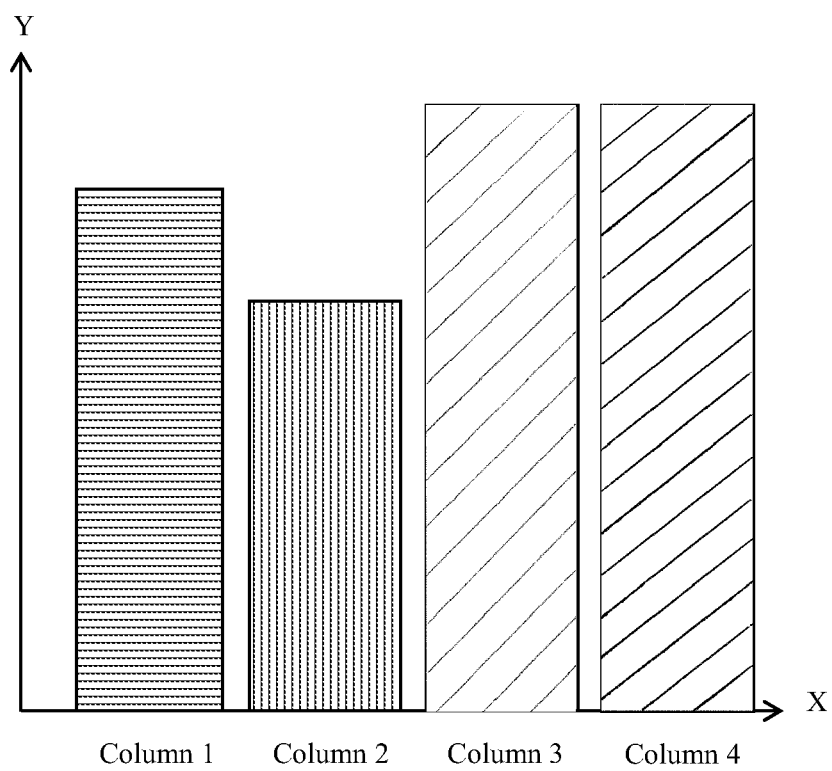
FIGS. 22A and 22B illustrate examples of modified images that include line patterns.

Referring back to FIG. 20A, even though the diagonal line patterns of Column 1 and Column 4 have different monochromatic (e.g. grayscale) shades, the line patterns may appear similar. The similarity in line patterns may even lead to difficulty in comprehending the image if, for example, the similar line pattern exists in adjacent or nearby areas of the image (which may occur if the original color image has different shades of the same color in adjacent or nearby areas of the color image). For example, FIG. 21 illustrates an example of a color image that may be received by the determination part 17c, where the adjacent columns 3 and 4 have different shades of the same color (i.e. light blue and dark blue). If the image processing apparatus 17 modifies the color image of FIG. 21 based on, for example, the color conversion information of FIG. 18A, then the resulting image may appear as the image illustrated in FIG. 22A. As seen in FIG. 22A, the adjacent columns 3 and 4 have similar diagonal line patterns that differ in the monochromatic (e.g. grayscale) shade of the line patterns.

Thus, according to another exemplary embodiment, the determination part 17b of the image processing apparatus 17 is configured to determine that adjacent (or nearby) two-dimensional areas of the original color image have different 'shades' of the same color. The determination part 17b may determine that adjacent (or nearby) two-dimensional areas of the original color image have different 'shades' of the same color, by analyzing the color image data for each of the pixels in the image and checking if a predetermined number of pixels within a predetermined distance of each other have corresponding color image data that indicates different 'shades' or 'strengths' of the same color (such as a light blue and a dark blue, for example).

After the determination part determines that adjacent two-dimensional areas of the original color image have different 'shades' of the same color (and after the determination part determines, based on color conversion information, the line patterns corresponding to the two-dimensional areas), the processing part 17c is configured to adjust the image data of the line patterns corresponding to each of the adjacent two-dimensional areas, in order to generate line patterns that are less similar. The adjustments to the image data of the line patterns may include, for example, adjusting the monochromatic (e.g. grayscale) shade of the line patterns, adjusting the distance between the lines in the line patterns, adjusting the width of the lines patterns, combinations of the above, etc.

Figure 22B:
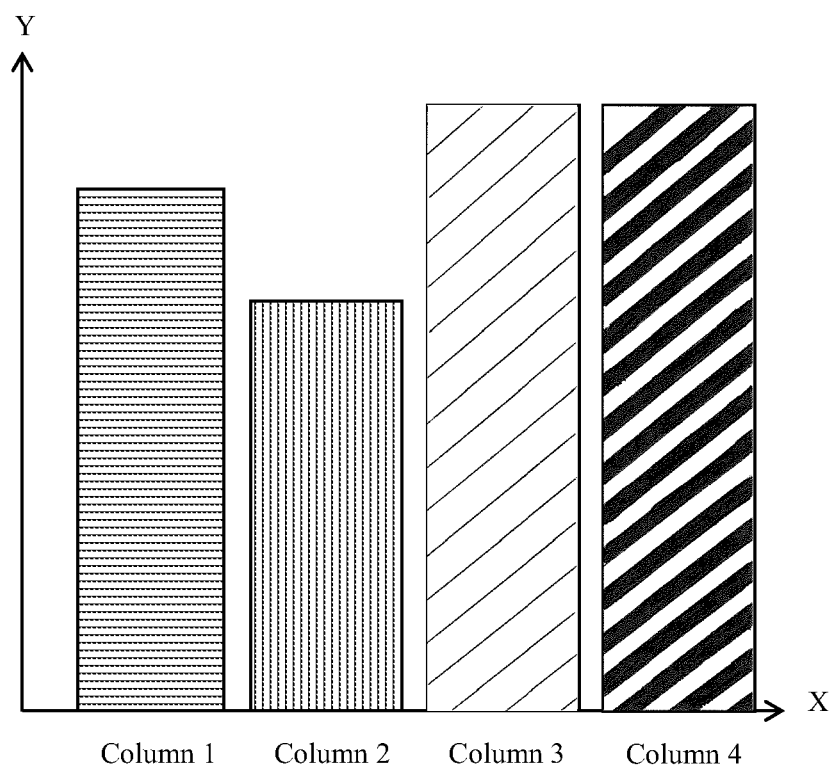

As an example, if the determination part receives the color image of FIG. 21, the determination part may determine that the adjacent or nearby two-dimensional areas "Column 3" and "Column 4" of the original color image have different 'shades' of the same color (i.e. light blue and dark blue). Accordingly, after the determination part determines, based on color conversion information of FIG. 18A for example, the line patterns corresponding to the solid colors in the two-dimensional areas, the processing part 17c then adjusts the line patterns corresponding to each of the adjacent two-dimensional areas, in order to generate line patterns that are less similar. For example, the processing part may modify the pixel image data of the line patterns in order to increase the width of the lines in the line pattern of column 4 and/or decrease the width of the lines in the line pattern of column 3, as illustrated in FIG. 22B.

Moreover, according to this embodiment, instead of determining that the adjacent two-dimensional areas of the original color image have different 'shades' of the same color, the determination part or processing part may instead check whether the adjacent or neighboring line patterns in a modified image are similar or have similar properties. For example, the determination part may check whether the adjacent line patterns have a similar monochromatic (e.g. grayscale) shade, or a similar line width, or a similar distance between lines, etc. As an example, if the image processing apparatus 17 has already modified the color image of FIG. 21 based on the color conversion information of FIG. 18A, then the image processing apparatus will generate the image of FIG. 22A. Thereafter, the determination part 17b may determine that the adjacent or neighboring line patterns in Column 3 and Column 4 are similar or have similar properties (i.e. the pixel image data of the line patterns indicates the same diagonal pattern, same line width, same distance between lines, relatively similar monochromatic shade, etc.). The processing part 17c then adjusts the line patterns corresponding to one or more of the adjacent two-dimensional areas, in order to generate a modified image where the line patterns are less similar. For example, the processing part may modify the pixel image data of the line patterns in order to increase the width of the lines in the line pattern of column 4 and/or decrease the width of the lines in the line pattern of column 3, as illustrated in FIG. 22B.

Figure 23:
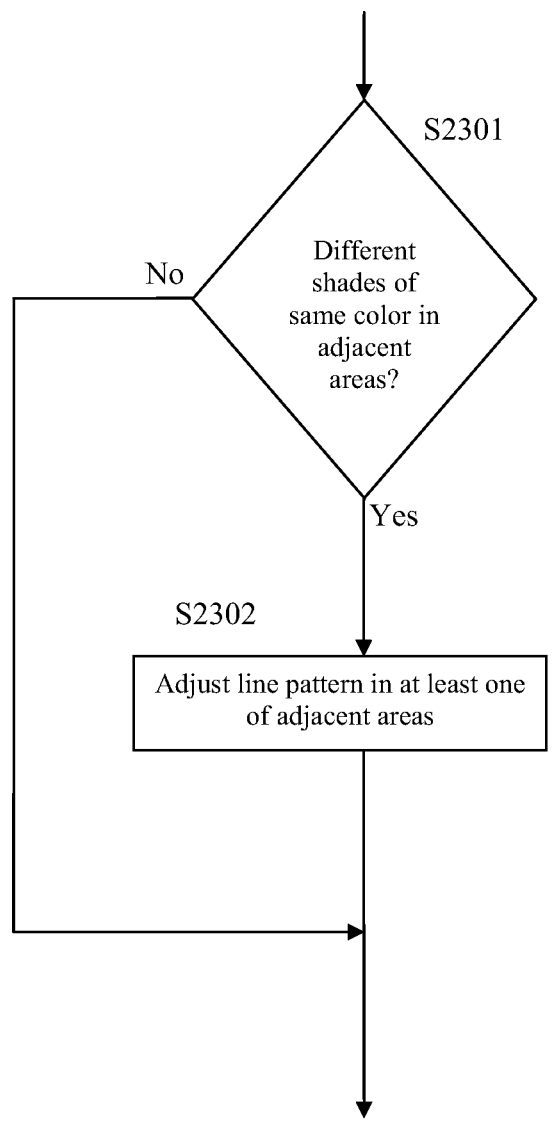
FIG. 23 shows a flowchart of a method performed by an image processing apparatus, such as image processing apparatus 17 illustrated in FIG. 1, according to an exemplary embodiment.

Turning now to FIG. 23, there is shown a flowchart of a method performed by an image processing apparatus (such as image processing apparatus 17 illustrated in FIG. 1) according to an exemplary embodiment.

In S2301, the image processing apparatus determines whether adjacent two-dimensional areas of the original color image have different 'shades' of the same color. An example of a color image where adjacent two-dimensional areas of the color image have different 'shades' of the same color is illustrated in FIG. 21. (Alternatively, in S2301 the determination part or processing part may check whether adjacent or neighboring line patterns in a modified image are similar or have similar properties; an example of a modified image having adjacent line patterns that are similar is illustrated in FIG. 22A). In S2302, the image processing apparatus adjusts at least one of the line patterns corresponding to each of the adjacent two-dimensional areas, in order to generate a modified image where the line patterns are less similar. An example of a modified image, where the widths of the line patterns in adjacent two-dimensional areas of the image have been adjusted, is illustrated in FIG. 22B.

In the exemplary embodiment illustrated in FIG. 1, the image processing apparatus is depicted as directly including or physically incorporating the maintenance part 17a, determination part 17b and processing part 17c. However, one or more of the aforementioned parts of the image processing apparatus may be located externally from the image processing apparatus, wherein the image processing apparatus accesses remotely the functionalities of these external parts.

Figure 24:
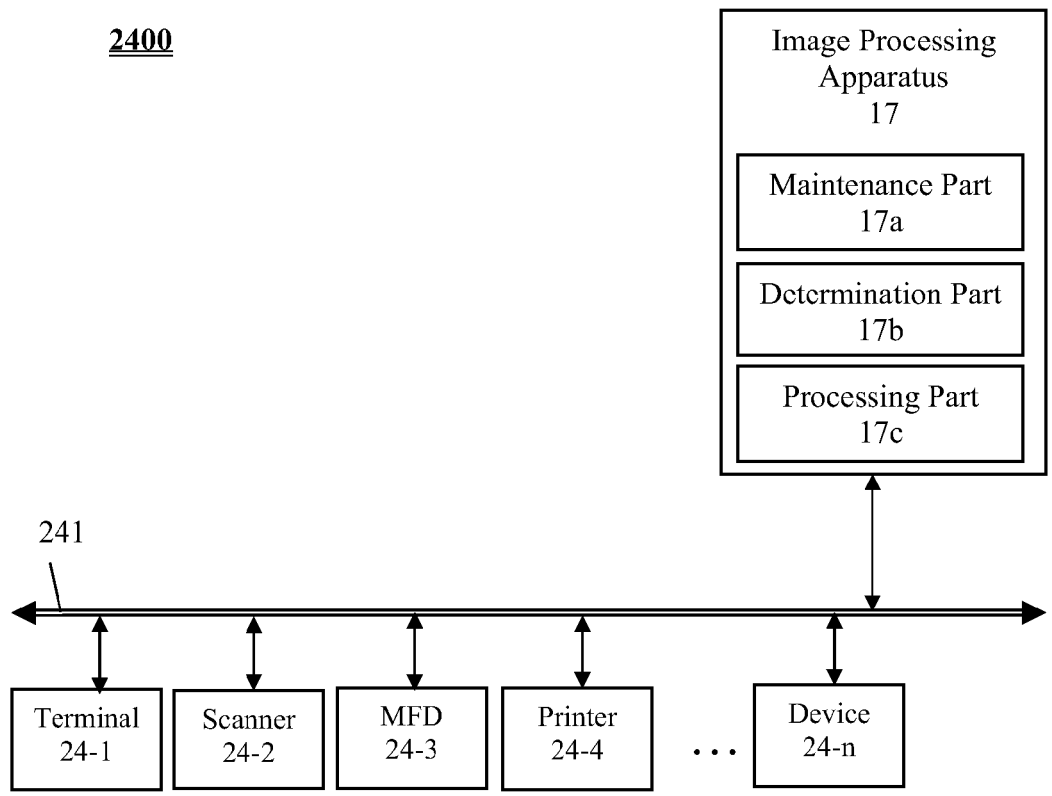
FIG. 24 shows a block diagram of a system, according to another exemplary embodiment.

FIG. 24 illustrates an example of a system 2400 according to another exemplary embodiment, where the image processing apparatus 17 is connected to a network 241. Other devices 24-1 through 24-n are also connected to the network including, for example, a terminal 24-1, scanner 24-2, multi-function device 24-3, printer 24-4, etc. The image processing apparatus 17 receives an image including color portions and/or monochrome line pattern portions from one of the devices 24-1 through 24-n, such as terminal 24-1, scanner 24-2 or multi-function device 24-3, for example. The image processing apparatus 17 may transmit the converted image to one of the devices 24-1 through 24-n, such as terminal 24-1, scanner 24-2, multi-function device 24-3, or printer 24-4, for example. In this embodiment, the image processing apparatus 17 may further function as a printer server for the network 241.

While the example shown in FIG. 24 includes one image processing apparatus, it should be appreciated that such numbers of devices, terminals and apparatuses are arbitrary and are selected as an example in order to facilitate discussion, and that the subject matter of this disclosure can be implemented in a system including one or more systems, servers, apparatuses and terminals. Other devices, such as scanners, printers and multi-function devices may also be connected to a network, as is well known in the art. Further, the image processing apparatus and network devices may be connected in a different network arrangement to that depicted in FIG. 24.

The network 241 can include one or more of a secure intranet or extranet local area network, a wide area network, any type of network that allows secure access, etc., or a combination thereof. Further, other secure communications links (such as a virtual private network, a wireless link, etc.) may be used as well in the network 241. In addition, the network 241 preferably uses TCP/IP (Transmission Control Protocol/Internet Protocol), but other protocols can also be used. How devices can connect to and communicate over the network 241 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 25A:
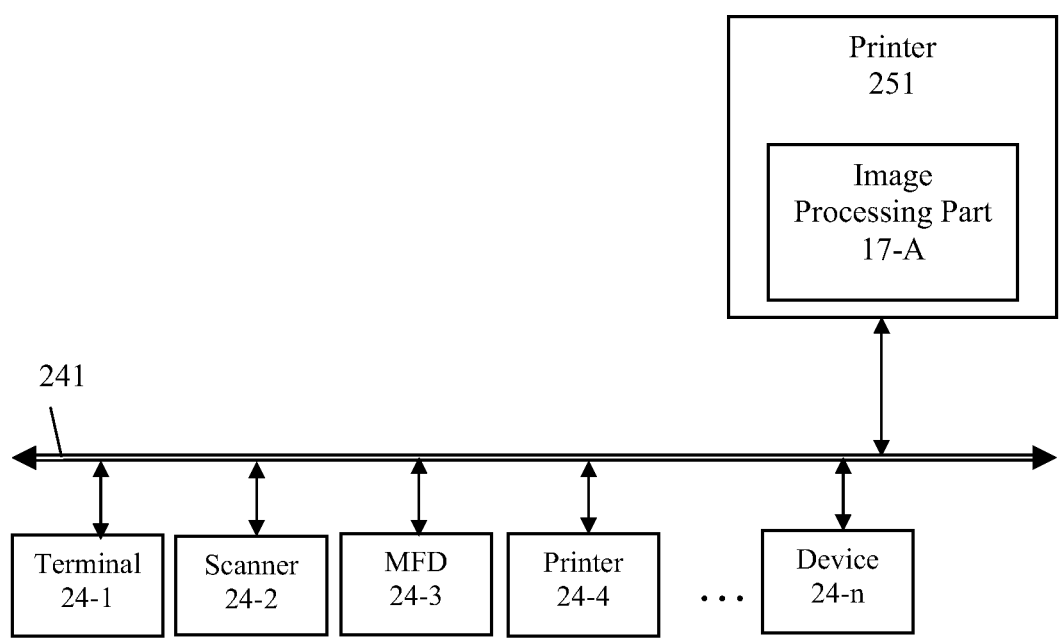
FIGS. 25A-25D show block diagram of systems, according to other exemplary embodiments.

While the example shown in FIG. 24 depicts the image processing apparatus 17 as being external to the network devices, the image processing apparatus 17 may instead or in addition be a component of a network device. For example, FIG. 25A depicts an example of a system 2500-A according to another exemplary embodiment, wherein the image processing part 17-A is included as a part of printer 251 connected to the network 241. The image processing part 17-A may be substantially similar to the image processing apparatus 17, and may include a maintenance part, determination part and processing part as described in this disclosure. The image processing part 17-A may in addition function as a printer driver for the printer 251.

Figure 25B:
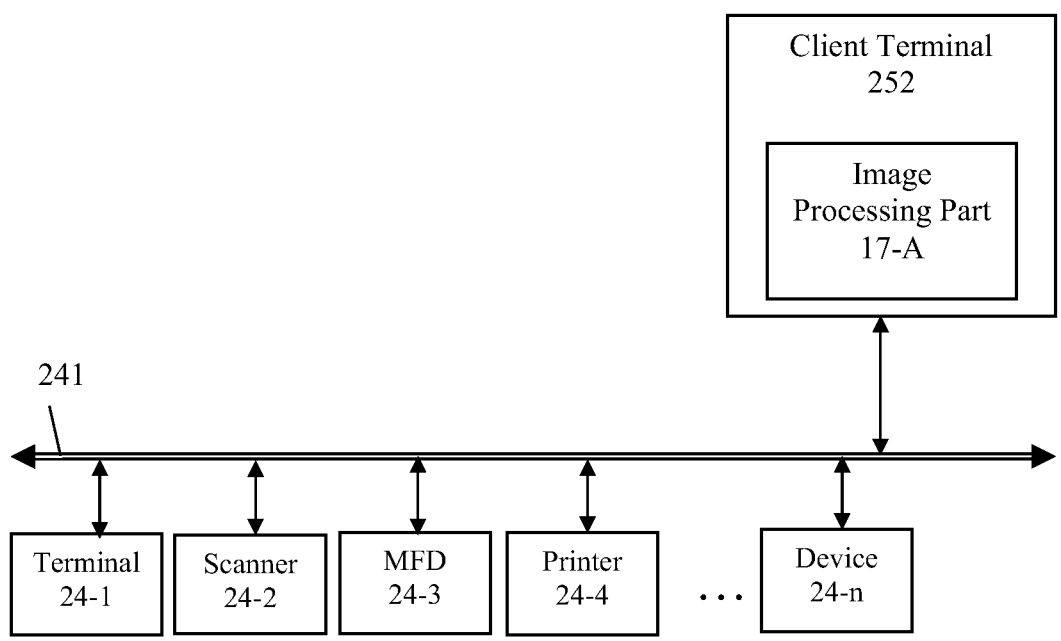
Figure 25C:
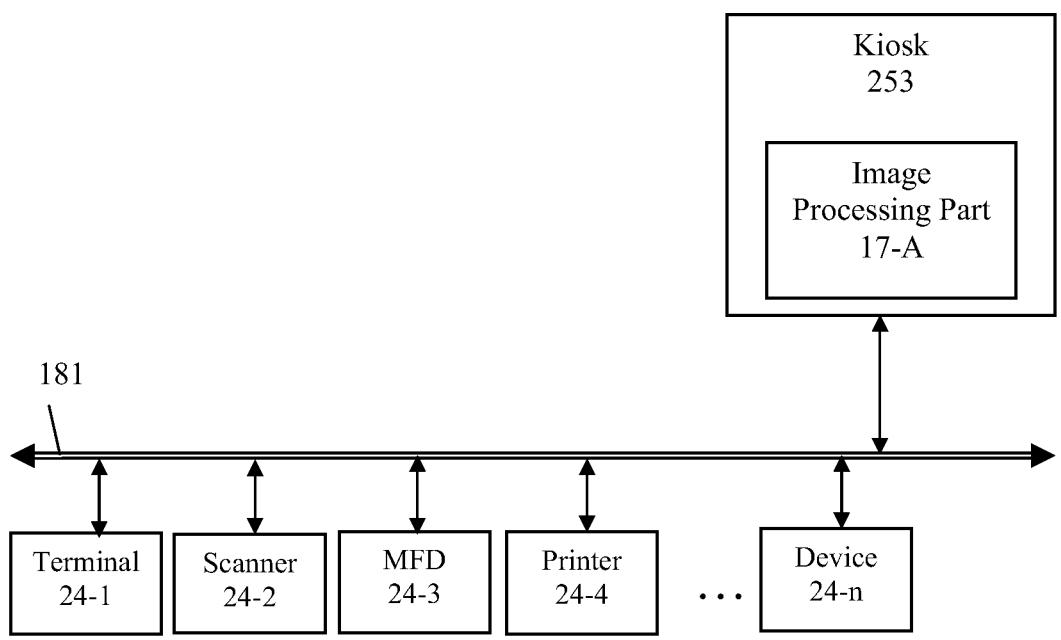
Figure 25D:
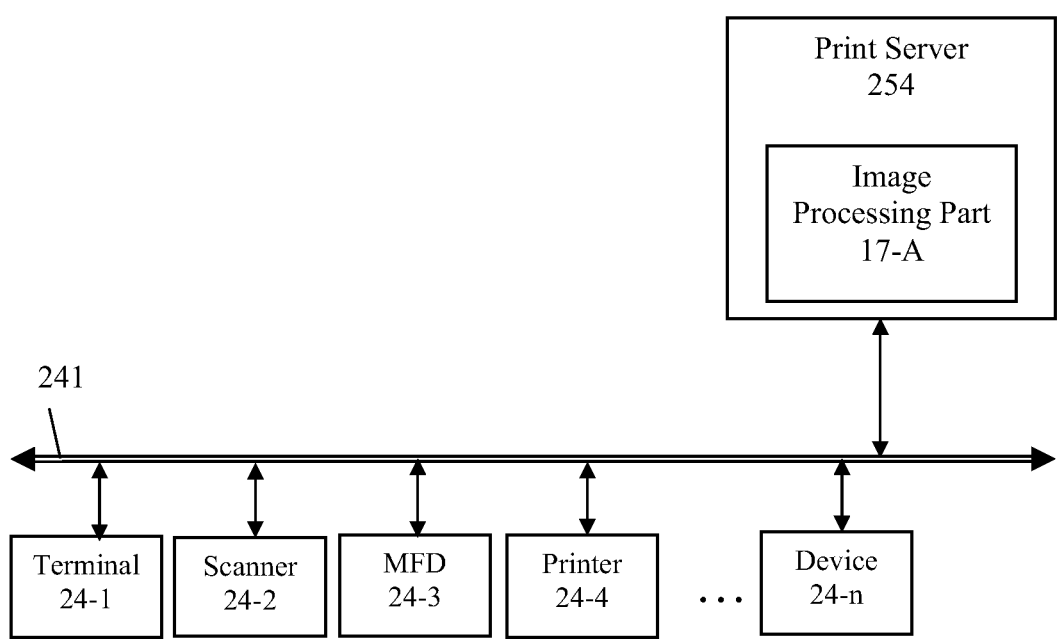

As another example, FIG. 25B depicts an example of a system 2500-B, wherein the image processing part 17-A is included as a part of client terminal 252 connected to the network 241. The image processing part 17-A may in addition function as a printer driver for the client terminal 252. Similarly, FIG. 25C depicts an example of a system 2500-C, wherein the image processing part 17-A is included as a part of kiosk 253 connected to the network 241. The kiosk may include, for example, a display screen, a keyboard or touchscreen, a printer, etc. The image processing part 17-A may in addition function as a printer driver for the kiosk 253. Likewise, FIG. 25D depicts an example of a system 2500-D, wherein the image processing part 17-A is included as a part of print server 254 connected to the network 241. The print server 254 may manage printing operations for the network 241.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. An image processing apparatus or processing color charts, said image processing apparatus comprising:
   a maintenance part configured to maintain color conversion information mapping each of a plurality of colors to a corresponding line pattern;
   a determination part configured to receive color image data for an image, determine a two-dimensional area of the image having a first color that is homogeneous in said two-dimensional area, and determine, based on the color conversion information maintained by the maintenance part, a first line pattern corresponding to the first color; and a processing part configured to modify the image by reproducing the two-dimensional area with the first line pattern in place of the first color, to generate a converted image, wherein the determination part determines that adjacent two-dimensional areas of the image include different shades of a particular color, and the processing part adjusts a line pattern corresponding to one of said adjacent two-dimensional areas, by increasing or decreasing the width of the lines in the line pattern.

2. The apparatus of claim 1, wherein each of the line patterns corresponding to the each of the plurality of colors is a different line pattern.

3. The apparatus of claim 1, wherein each of the line patterns includes only a plurality of parallel lines oriented in a specific direction.

4. The apparatus of claim 1, wherein if the determination part determines that the first color can be represented as a combination of two or more colors in accordance with an additive color scheme, then the determination part determines that the first line pattern corresponding to the first color is a combination of respective line patterns of said two or more colors.

5. The apparatus of claim 1, wherein the determination part receives a second image, and determines a second two-dimensional area of the second image having a second line pattern that is homogeneous in said second two dimensional area, and determines based on the color conversion information maintained by the maintenance part, a second color corresponding to the second line pattern.

6. The apparatus of claim 5, wherein the processing part modifies the second image by reproducing the second two-dimensional area with the second color in place of the second line pattern.

7. The apparatus of claim 5, wherein if the determination part determines, based on the color conversion information, that the second line pattern is a combination of respective line patterns of two or more colors, then the determination part determines that the second color corresponding to the second line pattern is a combination of said two or more colors in accordance with an additive color scheme.

8. The apparatus of claim 7, wherein the processing part modifies the second image by reproducing the second two-dimensional area with the second color in place of the second line pattern.

9. An image processing apparatus for processing color charts, said image processing apparatus comprising;

a maintenance part configured to maintain color conversion information mapping each of a plurality of colors to a corresponding line pattern;

a determination part configured to receive color image data for an image, determine a two-dimensional area of the image having a first color that is homogeneous in said two-dimensional area, and determine, based on the color conversion information maintained by the maintenance part, a first line pattern corresponding to the first color; and a processing part configured to modify the image by reproducing the two-dimensional area with the first line pattern in place of the first color, to generate a converted image, wherein the determination part determines that line patterns in adjacent two-dimensional areas of the converted image have similar properties, and the processing part adjusts a line pattern amongst said line patterns in the adjacent two-dimensional areas of the converted image, by increasing or decreasing the width of the lines in the line pattern.

10. An image processing apparatus for processing color charts, said image processing apparatus comprising;

a maintenance part configured to maintain color conversion information mapping each of a plurality of line patterns to a corresponding color;

a determination part configured to receive image data for an age, determine a two-dimensional area of the image having a line pattern that is homogeneous in said two-dimensional area, and determine, based on the color conversion information maintained by the maintenance part, a first color corresponding to the line pattern; and a processing part configured to modify the image by reproducing the two-dimensional area with the first color in place of the line pattern, to generate a converted image, wherein the determination part determines that line patterns in adjacent two-dimensional areas of the converted image have similar properties, and the processing part adjusts a line pattern amongst said line patterns in the adjacent two-dimensional areas of the converted image by increasing or decreasing distance between lines in the line pattern.

11. The apparatus of claim 10, wherein if the determination part determines that the line pattern can be represented as a combination of respective line patterns of two or more colors, then the determination part determines that the first color corresponding to the line pattern is a combination of said two or more colors in accordance with an additive color scheme.

12. A method for an image processing apparatus to process color charts, said method comprising:

maintaining color conversion information mapping each of a plurality of colors to a corresponding line pattern;

receiving color image data for an image, determining a two-dimensional area of the image having a first color that is homogeneous in said two-dimensional area, and determining, based on the color conversion information maintained by the maintenance part, a first line pattern corresponding to the first color;

modifying the image by reproducing the two-dimensional area with the first line pattern in place of the first color, to generate a converted image;

determining that adjacent two-dimensional areas of the image include different shades of a particular color; and adjusting a line pattern corresponding to one of said adjacent two-dimensional areas, by increasing or decreasing the width of the lines in the line pattern.

13. The method of claim 12, further comprising:

determining that the first color can be represented as a combination of two or more colors in accordance with an additive color scheme; and determining that the first line pattern corresponding to the first color is a combination of respective line patterns of said two or more colors.

14. The method of claim 12, further comprising:

receiving a second image, and determining a second two-dimensional area of the second image having a second line pattern that is homogeneous in said second two dimensional area, and determining based on the color conversion information maintained by the maintenance part, a second color corresponding to the second line pattern.

15. The method of claim 14, further comprising:

modifying the second image by reproducing the second two-dimensional area with the second color in place of the second line pattern.

16. The method of claim 14, further comprising:
- determining based on the color conversion information, that the second line pattern is a combination of respective line patterns of two or more colors; and
- determining that the second color corresponding to the second line pattern is a combination of said two or more colors in accordance with an additive color scheme.

17. The method of claim 16, further comprising:
- modifying the second image by reproducing the second two-dimensional area with the second color in place of the second line pattern.

18. A method for an image processing apparatus to process color charts, said method comprising:
- maintaining color conversion information mapping each of a plurality of colors to a corresponding line pattern;
- receiving color image data for an image, determining a two-dimensional area of the image having a first color that is homogeneous in said two-dimensional area, and determining, based on the color conversion information maintained by the maintenance part, a first line pattern corresponding to the first color;
- modifying the image by reproducing the two-dimensional area with the first line pattern in place of the first color, to generate a converted image;
- determining that line patterns in adjacent two-dimensional areas of the converted image have similar properties; and
- adjusting a line pattern amongst said line patterns in the adjacent two-dimensional areas of the converted image, by increasing or decreasing the width of the lines in the line pattern.

* * * * *